United States Patent [19]
Arends et al.

[11] Patent Number: 5,371,361
[45] Date of Patent: Dec. 6, 1994

[54] OPTICAL PROCESSING SYSTEM

[75] Inventors: Thomas C. Arends; James E. Colley; Blaine F. Loris, all of Eugene; Donald S. Peterson, Philomath; James W. Ring, Eugene; Matt D. Schler, Eugene, all of Oreg.

[73] Assignee: Spectra-Physics Scanning Systems, Inc., Eugene, Oreg.

[21] Appl. No.: 12,289

[22] Filed: Feb. 1, 1993

[51] Int. Cl.$^5$ ............................................. H01V 3/14
[52] U.S. Cl. .................................. 259/235; 235/467
[58] Field of Search .............. 250/235, 234, 236, 566, 250/568; 235/462, 467

[56] References Cited

U.S. PATENT DOCUMENTS

| | | |
|---|---|---|
| 4,000,397 | 12/1976 | Hebert et al. . |
| 4,386,272 | 5/1983 | Check, Jr. et al. ................. 250/236 |
| 4,792,666 | 12/1988 | Cherry et al. ....................... 235/466 |
| 4,807,291 | 2/1989 | Hoffmann et al. .................... 381/49 |
| 4,808,804 | 2/1989 | Krichever et al. ................. 235/462 |
| 4,951,141 | 8/1990 | Fisher ................................. 358/139 |
| 5,080,456 | 1/1992 | Katz et al. . |
| 5,103,209 | 4/1992 | Lizzi et al. ........................ 340/572 |

FOREIGN PATENT DOCUMENTS

| | | |
|---|---|---|
| 0384955 | 9/1990 | European Pat. Off. . |
| 0385478 | 9/1990 | European Pat. Off. . |
| 0433593 | 6/1991 | European Pat. Off. . |

OTHER PUBLICATIONS

Arthur B. Williams, *Electronic Filter Design Handbook*, pp. 2-1 to 2-4, Sections 2.2, 2.5, 2.6, 2.7, Chapter 3, Tables 12-41 through 12-55 (1981 McGraw-Hill, Inc.).

Lawrence Rabiner and Bernard Gold, *Theory and Application of Digital Signal Processing*, Chapters 3 and 4 (1975 Prentice Hall, Inc.).

*DC Motors, Speed Controls, Servo Systems, Including Optical Encoders*, 5th Edition, Chapter 7 (Electro Craft Corporation, 1980).

*Primary Examiner*—David C. Nelms
*Attorney, Agent, or Firm*—Lyon & Lyon

[57] ABSTRACT

A method and apparatus for holding an otherwise variable parameter in a scanner approximately constant over a desired scan volume to improve the ability to compensate for unwanted variations in the amplitude modulation depth of a signal is provided, the signal being determined from collected light reflected from a target. In one embodiment, the time domain impulse response of the opto-mechanical system is the parameter which is held approximately constant by appropriately positioning the beam waist so that the beam spot size diverges approximately linearly along the beam axis within the scan volume.

70 Claims, 14 Drawing Sheets

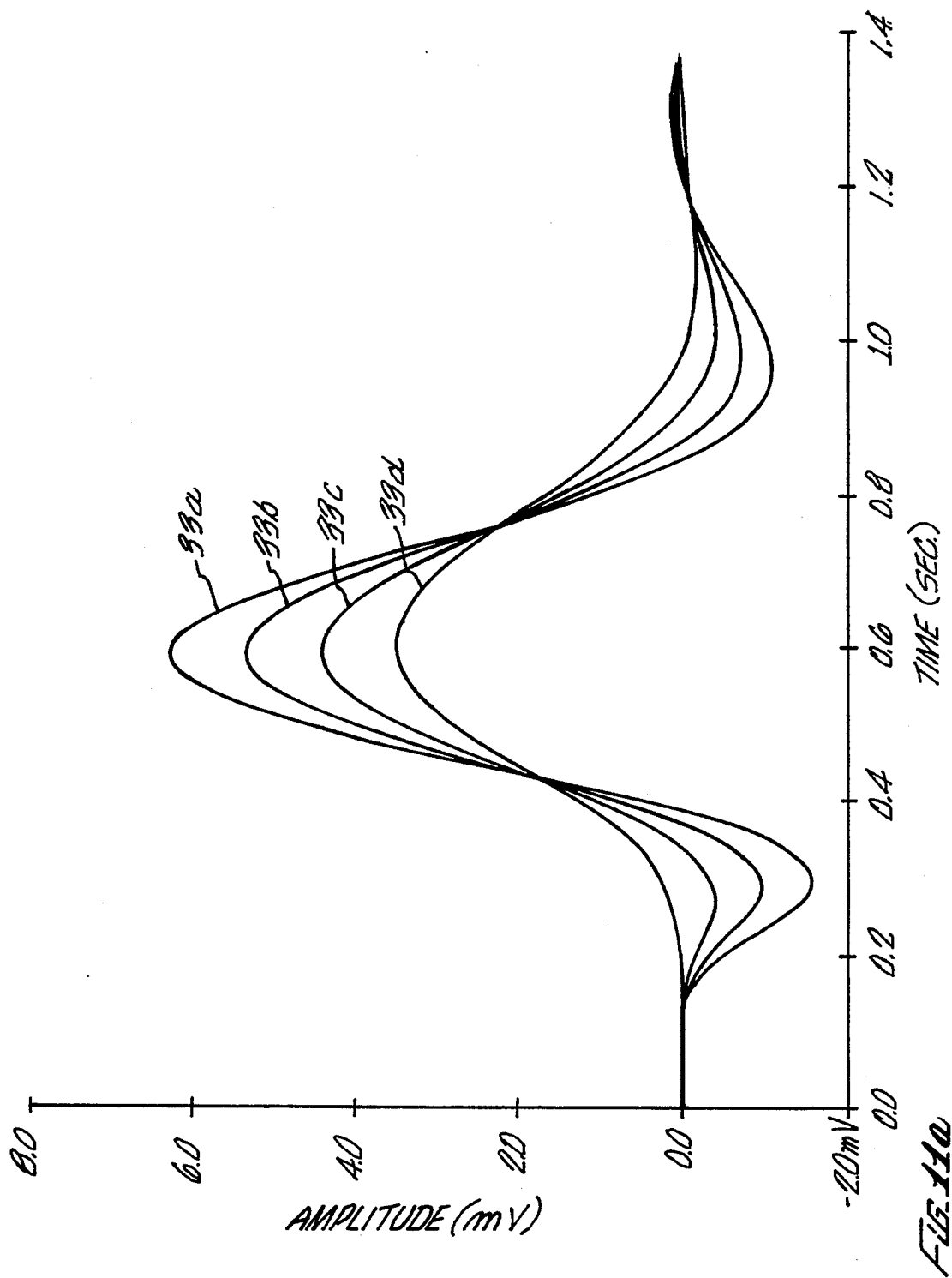

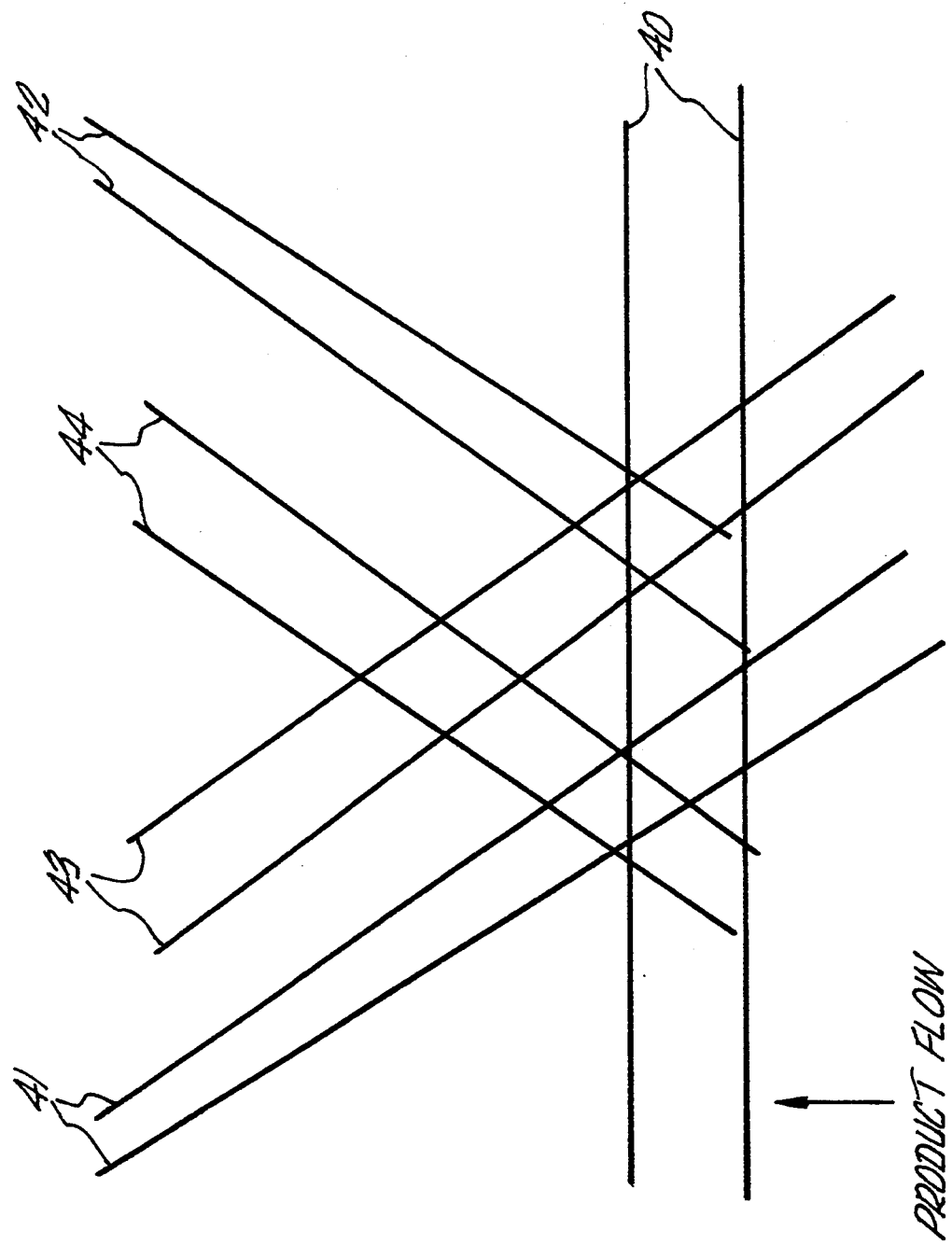

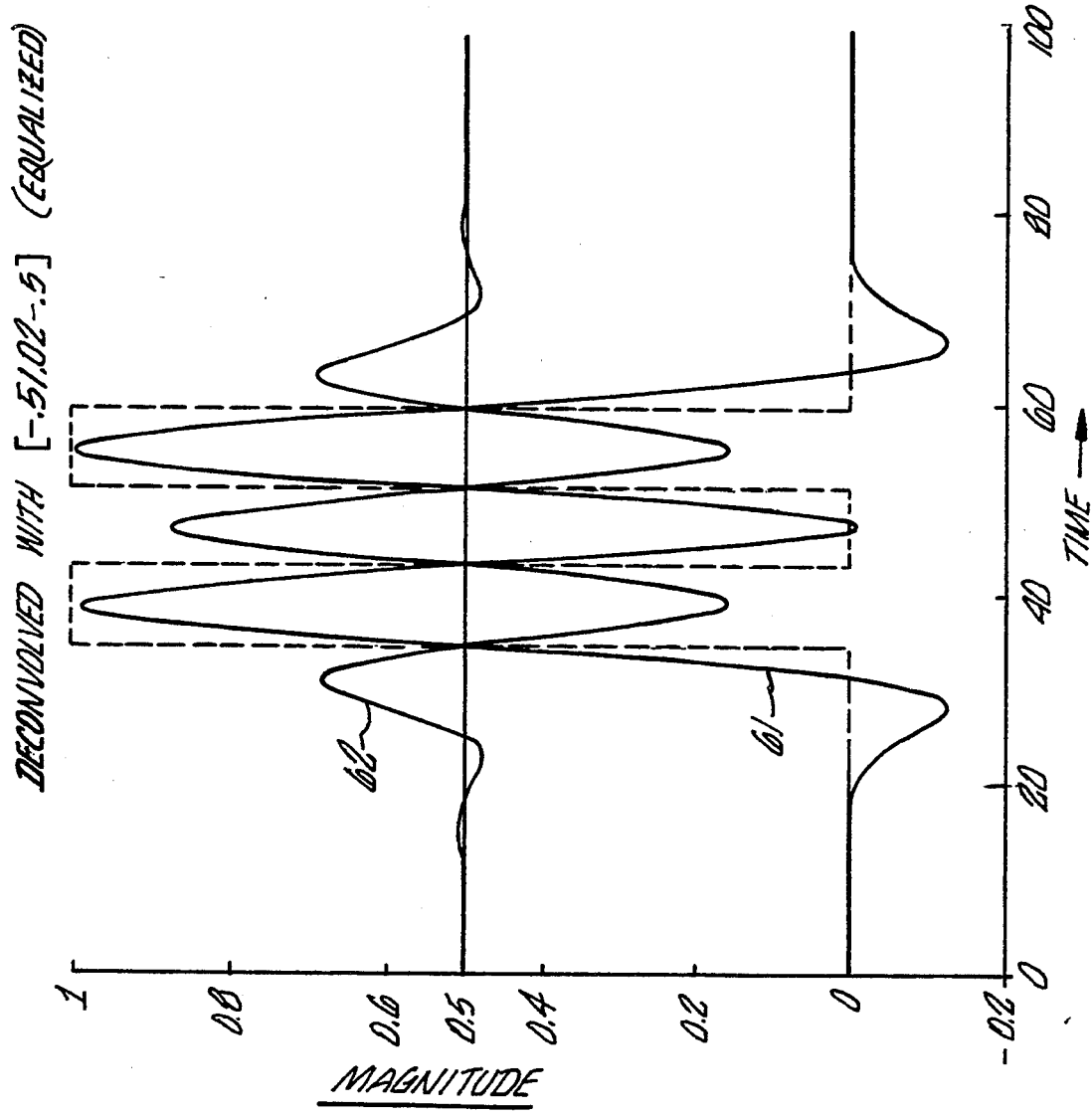

OPTICAL PROCESSING SYSTEM

FIELD OF THE INVENTION

The field of the present invention relates generally to optical systems which characterize features on an object including the relative position of features on a target symbol or object. These systems may include but are not limited to bar code scanners and optical character recognition (OCR) systems. More specifically, this invention relates to improvements in such a system which provide benefits such as a greater depth of field, improved probability of a correct scan on the first pass, a reduced need for adaptive thresholding, and a reduction in required dynamic range.

Although the following description of this invention makes reference to bar code scanners, by way of example, the invention itself is equally applicable to other apparatus used for scanning or recognizing symbols, data, or objects (collectively referred to as targets).

DEFINITIONS

The following definitions, as used in this disclosure, are set forth only as an aid to the reader and are not meant to restrict, or otherwise limit, the scope of the invention as disclosed:

Scan Volume: The volume in space adjacent to the window of a scanner over which the scanner can successfully read or recognize a target;

Depth of Field: The distance over which a scanner can successfully read or recognize a target, measured in one dimension along the beam propagation path;

Impulse Response: The time domain impulse response of the opto-mechanical subsystem of the scanner is defined as the analog signal which results from scanning the beam over a narrow dark bar or element placed within the scan volume. For the electrical subsystem, it is the response to a pulse at the input of infinitesimal width. For an optical system it is the image of a point at infinity;

Equalization: For the purposes of this patent, equalization is defined as the application of a filter to a signal S(z), which has been distorted by some function F(z). The equalization filter is designed to compensate for the negative effects of F(z), thus restoring S(z) to nearly its original state. Normally this is only possible over a limited range of z, and over this range, the equalization filter can be thought of as the inverse of F(z), that is, 1/F(z). Thus, the combined effect of F(z) times 1/F(z) is approximately equal to one over some prescribed range. Note that the domain of the variable z may be one-dimensional or two-dimensional, and that the equalization need not be perfect to be of practical benefit;

Constant impulse response scanning system: A scanning system in which the opto-mechanical subsystem impulse response is uniform enough throughout the scan volume to achieve the desired goal of equalizing the system with a single, time-invariant filter, without under- or over-compensating at any one target position within the scan volume;

Spot Velocity: The linear velocity of the cross section of the beam, as imaged upon the plane of the target;

Amplitude modulation depth: The difference between the signal amplitude for a dark feature and the signal amplitude for a light feature; and, Beam Waist: The point along the beam axis at which the width of the beam intensity profile is minimum, measured parallel to the direction of spot motion. The examples and figures discussed herein assume a Gaussian intensity profile, for which the waist location is well defined, but useful embodiments of the subject invention can also be implemented with other intensity profiles.

BACKGROUND OF THE INVENTION

An opto-mechanical system configured for use in a bar code scanner is illustrated in FIG. 1. As shown, the system comprises light source 1 (typically a laser), focusing optics 2, fold mirror 2a, and scanning mirror 3. The system may also include folding and/or pattern generation mirrors (not shown). Light beam 5 is emitted from light source 1, whereupon it is directed to travel along an optical path. Focusing optics 2 are placed along the optical path, and are utilized to focus the beam 5, to provide a minimum diameter at point 6, known as the beam waist. A scanning mirror 3 (illustrated as a facet wheel which is typically in the shape of a polygon) is placed along the optical path, and caused to rotate by a motor (not shown) around center of rotation point 3a. The light source 1, focusing optics 2, and scanning mirror 3 are typically placed in the interior of a housing having a window 4, through which the beam is directed to emerge from the housing. The window 4 is configured with appropriate transmission characteristics to enable the beam 5 to exit the interior of the housing with minimal loss.

In operation, the scanner is aimed towards a target (e.g., a bar code symbol), with the scanning mirror 3 (and pattern generation mirrors if present) operating to scan the beam 5 over the target in a predetermined pattern. A collection subsystem (not shown) which typically includes a photodetector, then collects at least some of the light reflected or scattered off the target, and the photodetector produces an analog signal having an amplitude determined by the intensity of the collected light. Since more light reflects off lighter areas than dark areas (or elements), the amplitude of the analog signal will vary accordingly as the beam 5 scans the target.

The scanner also includes a signal processing subsystem (not shown) for digitizing the analog signal and providing a digital signal, where the width of and spacing between the pulses in the digital signal corresponds to the width of the dark and light areas (e.g., bars/spaces or elements) making up the target. The digital signal is then decoded by a decoder (not shown), either located within the scanner, or located externally to it.

As shown, the outer bounds of the scan volume, identified with numerals 7 and 8 in FIG. 1, are typically situated on either side of the beam waist 6.

One reason why there are limits to the scan volume is, as illustrated in the figure, that on either side of the beam waist, along the beam axis 6a, e.g., at locations 6' and 6" in FIG. 1, the beam diameter, or spot size, increases as a function of the distance from the beam waist 6. This is due to fundamental diffraction effects. As the beam diameter increases, the ability to successfully read targets, especially those with closely spaced elements, diminishes, and eventually is lost. Performance at the outer extremes of the scan volume is further limited by collected optical power, which decreases approximately as the square of the distance from the scanner. Together these factors determine the outer bounds of the scan volume.

The limitation due to spot size can be explained with reference to FIGS. 2a–2b. FIG. 2a illustrates an analog signal 10 which results from passing a laser beam 9 across a target 11 (in this example a bar code symbol) in the indicated scanning direction. As shown in FIG. 2d, the diameter of the beam 9 is no larger than the smallest dark or light element in the target symbol (identified with width $t_1$). Accordingly, the amplitude modulation depth of the portion of the analog signal which derives from the more closely spaced elements 12a, identified with reference numeral 12b in the figure, is about the same as the amplitude modulation depth of the portion of the analog signal which derives from the less closely spaced elements 13a, identified with reference numeral 13b in the figure.

FIG. 2b illustrates the effect of scanning the same target with a beam 9' of larger diameter. FIGS. 2c and 2e illustrate the relationship of this larger beam 9' to the width of the narrower ($t_1$) and wider ($t_2$) bars in the example. As illustrated, the diameter of the beam 9' is larger than the width of the more closely spaced elements 12a' making up the target.

The amplitude modulation depth of the lower portion 12b' of the analog signal which derives from the more closely spaced elements 12a' is less than that of the higher portion 13b' of the analog signal which derives from the less closely spaced elements 13a'. This effect occurs since the beam 9' is too large to wholly fit within the confines of the more-closely spaced elements 12a', but not the less-closely spaced elements 13a'. Since the total energy contained in both the large and small spots is the same, the amplitude modulation depth of the analog signal will be determined by the amount of overlap between a spot and an element: Comparing three situations, when a narrow element 12a' is encountered by a larger spot 9', a situation illustrated in FIG. 2c, the amount of overlap (indicated by cross-hatching in the figure) is less than the amount of overlap between a smaller spot 9 and a narrow element 12a, a situation illustrated in FIG. 2d, and the amount of overlap between a larger spot 9' and a wider element 13a', a situation illustrated in FIG. 2e. Therefore, the amplitude modulation depth of the analog signal in the first situation will be less than that for the latter two situations.

Because of the reduced amplitude modulation depth of that portion of the analog signal which derives from the more-closely spaced elements 12a' (reference 12b' in FIG. 2b), it will be more difficult for the signal processing subsystem to distinguish that portion of the signal from noise due to ambient light and the like, and, therefore, to correctly digitize that portion of the analog signal. As the distance from the beam waist 6, and therefore the beam diameter, increases, eventually a point will be reached on either side of the beam waist 6 where the signal processing subsystem cannot successfully digitize that portion of the analog signal derived from the more-closely spaced bars.

Although attempts have been made to extend the limits of the scan volume, frequent drawbacks have been encountered. In European Publication No. 0 433 593, recognizing that the lower amplitude portion 12b' of the analog signal (as illustrated in FIG. 2b) will have a higher frequency than the higher amplitude portion 13b', a variable gain amplifier is utilized to selectively amplify the lower amplitude portion 12b' of the analog signal. The objective is to compensate for the effects of the larger spot size by configuring the amplifier to have a frequency response which has a greater gain over higher frequencies than at lower frequencies. This filter is utilized to amplify the lower amplitude portion 12b' of the analog signal until it is about equal to that of the higher amplitude portion 13b'.

One problem with this approach, as further described in the next section, is that the filter cannot be configured to properly compensate for the effects of large spot size at all points within the scan volume, since it will overcompensate or undercompensate for the effects of the large spot size at some points within the scan volume. A solution to this problem, proposed in European Publication 0 433 593, is to make the equalizing filter adapt to changes in detected frequency or target position. However, the hardware required to provide this feedback information is bulky and expensive, and the information itself is typically unreliable in high-throughput scanners where the target may only be scanned once as it passes through the scan volume. Another problem, also further described in the next section, is that the filter may have an asymmetrical impulse response, which results in alteration of the relative position of detected edges.

Another approach to increasing depth-of-field is the use of an optical element called an axicon to keep the beam diameter small over the desired range of distances, as described in U.S. Pat. No. 5,080,456. However, some of the disadvantages are that this approach is optically inefficient, does not average out paper noise, and does not inherently provide constant impulse response, the benefits of which will be described later.

Consequently, it is an object of the present invention to provide an optical scanning system and related method which overcomes these disadvantages.

SUMMARY OF THE INVENTION

In accordance with the purpose of the invention as broadly described herein, there is provided an optical scanner comprising an opto-mechanical system for providing a beam, directing the beam along an optical path to a target situated within a desired scan volume, and scanning the beam over the target in a predetermined pattern; a collection system for collecting light reflected from the target and converting it into an electrical current; an electrical system operatively coupled to the collection system for forming a signal having an amplitude modulation depth at least partly determined by the intensity of the collected light; a digitizer for generating a digital signal which assumes one state when the beam passes over a dark area or element and another state when the beam passes over a light area or element; and a decoder for translating element widths into character or other information. The opto-mechanical system is configured to direct the beam into the scan volume such that at least one parameter associated with the opto-mechanical system, which would otherwise vary along the beam axis within the scan volume, is held approximately constant, thereby improving the capability of the electrical system to compensate for unwanted variations in the amplitude modulation depth of the signal over the scan volume (e.g., through the use of a single, time-invariant equalizer).

In a first embodiment, the parameter which is held approximately constant is the width of the time domain impulse response of the opto-mechanical scanning system. This result is achieved by positioning the beam waist appropriately so that the beam spot size increases approximately linearly as distance from the scanner increases. Since the spot velocity in this embodiment also increases approximately linearly along the beam axis within the scan volume, the ratio of the two, which represents the width of the time domain impulse response, is held approximately constant throughout the scan volume.

In a second embodiment, the diameter of the beam and the linear spot velocity are the parameters which are held approximately constant. As a result, in this embodiment also, the pulse width of the system temporal impulse response is approximately constant regardless of distance from the scanner along the beam axis.

In a third embodiment, the parameter which is held approximately constant is the beam power.

In a fourth embodiment, the opto-mechanical system described above is replaced by an imaging system, wherein the target plane is imaged upon an optical element having an array of pixels which are scanned by electronic means, such that the temporal impulse response of the imaging system is held approximately constant regardless of distance between the optical element and the target.

BRIEF DESCRIPTION OF THE DRAWINGS

FIG. 7a is a series of plots of spot diameter vs. distance along the beam path in an exemplary scanner, where the location and beam diameter at the beam waist is varied;

FIG. 7b is a series of plots of the temporal impulse response pulse width of the opto-mechanical system vs. distance along the beam path in an exemplary scanner when the beam waist is situated at the scanning mirror;

FIG. 7c is a series of plots of the temporal impulse response pulse width of the opto-mechanical system vs. distance along the beam path in an exemplary scanner when the beam waist is situated at a predetermined distance downstream from the scanning mirror;

FIGS. 11a, 11b, and 11c are graphs illustrating the normalized time domain impulse response, the frequency domain magnitude response, and the frequency domain group delay, respectively, of an approximately symmetric equalization and/or signal processing filtering system;

FIG. 12 is a diagram illustrating the relative orientation of scan lines in an exemplary embodiment of a fixed scanner, as imaged onto the plane of the window;

FIGS. 15a and 15b are graphs illustrating target reflectance, modulation depth of the analog signal, and the second (time) derivative of the modulation depth curve for a system with and without linear phase equalization, respectively.

DETAILED DESCRIPTION OF THE PREFERRED EMBODIMENTS

An aspect of the subject invention is the recognition that some of the problems with the prior art approaches stem from the fact that the impulse response of the opto-mechanical system used therein varies according to the position of the target being scanned within the scan volume of the scanner. Because of this characteristic, the variable gain amplifier, whose function, as described, is to compensate for the effects of a large spot size, will only imperfectly perform this function within the scan volume. Specifically, at some locations along the beam axis within the scan volume, the variable gain amplifier will overcompensate (i.e., amplify the high frequency components of the analog signal too much); while at other locations within the scan volume, the amplifier will undercompensate (i.e., not amplify the high frequency components enough). The effect of overcompensation is to introduce under-shoot and over-shoot into the analog signal. During digitization, this distortion can cause erroneous generation of digital pulses, which can lead to improper decoding of the bar code target. The effect of undercompensation is that the signal amplitude modulation depth is reduced as the element (e.g., bar) width becomes small relative to the spot diameter, and, therefore, the target becomes unreadable. Again, improper digitization and decoding of the signal can result.

Figure 1:
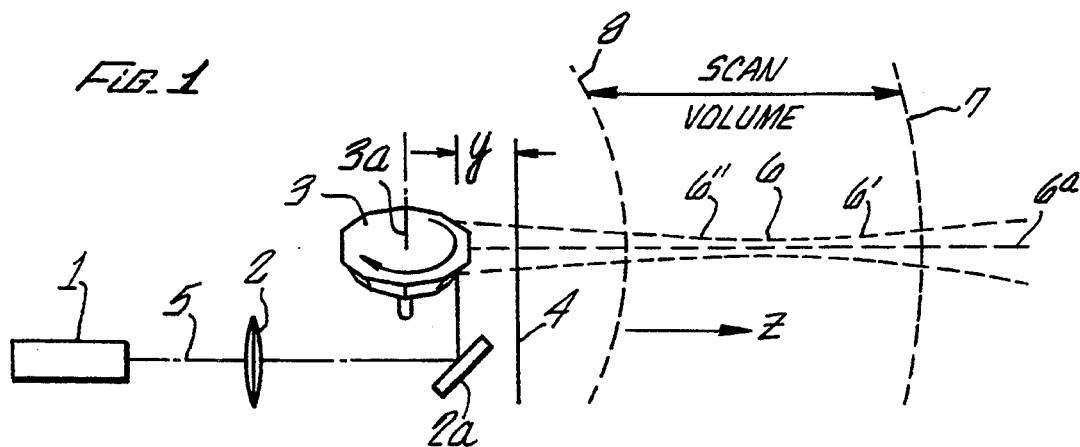
FIG. 1 is a schematic diagram of an opto-mechanical system for use in a bar code scanner.
Figure 2A:
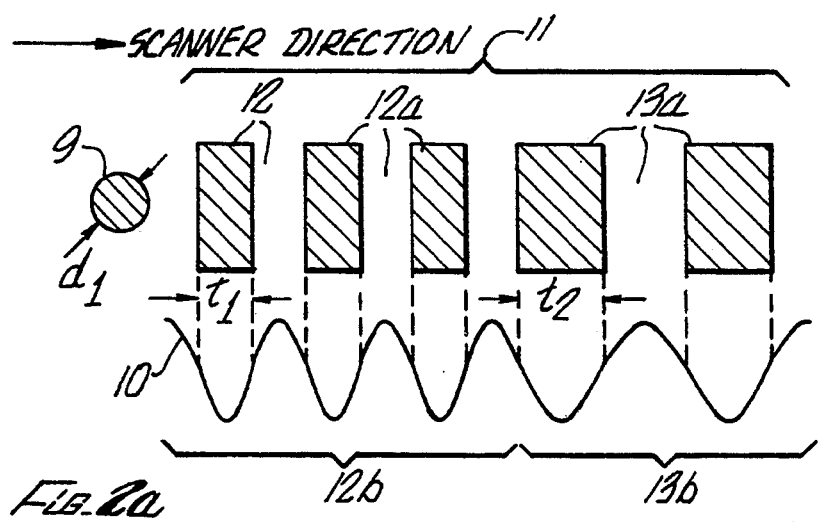
FIGS. 2a-2e are diagrams illustrating the variations in the amplitude modulation depth of the analog signal which derive from variations in spot size.
Figure 2B:
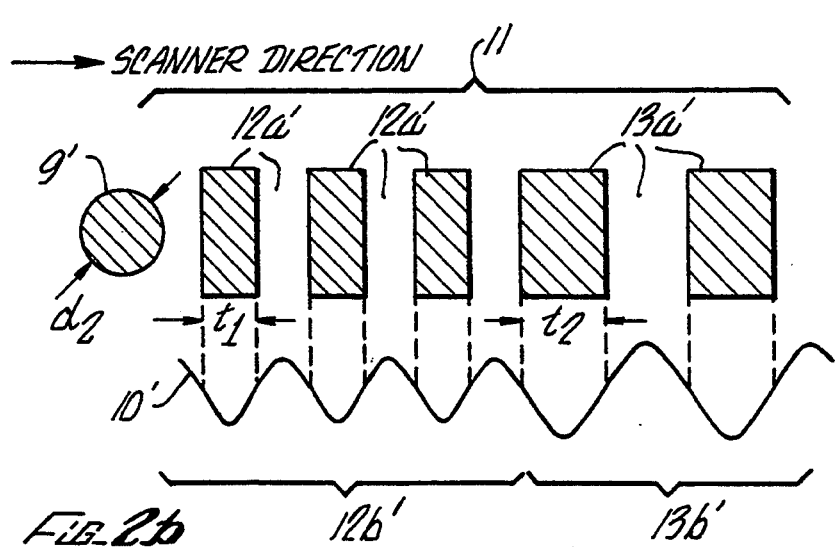
Figure 2C:
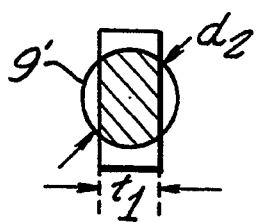
Figure 2D:
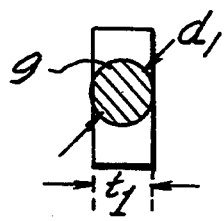
Figure 2E:
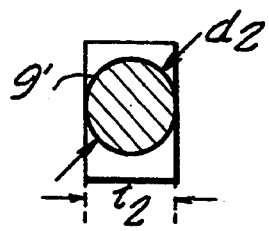
Figure 3:
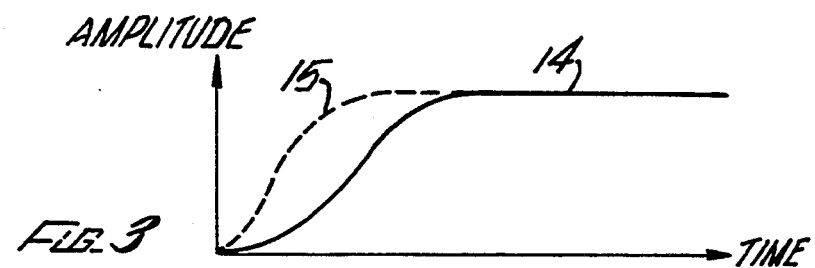
FIG. 3 is a graph illustrating variations in the step response of the opto-mechanical system which can occur along the beam axis within the scan volume.

One problem of overcompensation can be further explained with reference to FIG. 3, illustrating step response 14—which is a graph of the analog signal generated by passing the laser beam spot over a dark-to-light transition—of the opto-mechanical system at the location indicated with reference numeral 6' in FIG. 1. (The relationship between the impulse response and the step response is that the former is the time derivative of the latter.) A characteristic of the step response at location 6' is that the rise time (which correlates to the width of the impulse response) is slow because of the increased diameter of the spot size at that point compared with that at the beam waist. When the variable gain filter is applied to this signal, the result is a signal with a faster rise time, as indicated by signal 15 in FIG. 3.

Figure 4A:
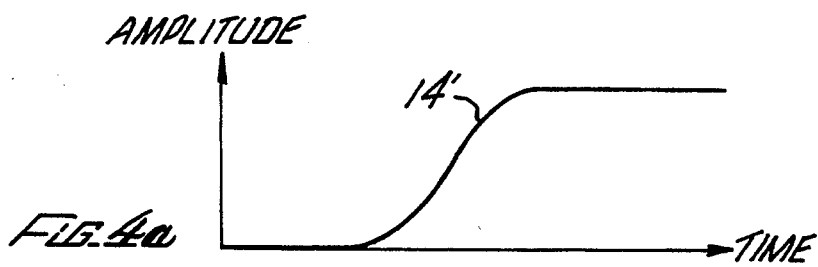
FIGS. 4a-4b are graphs illustrating effects of overcompensating for variations in spot size.

On the other hand, the step response of the conventional opto-mechanical system at location 6 of the scan volume, which is identified with reference numeral 14' in FIG. 4a, will have a faster rise time than the step response at location 6'. This effect is due to the fact that, as the target moves toward the scanner between location 6' and 6 along the beam axis, the spot size decreases at a faster rate than the spot velocity, such that the duration of the step response is reduced. Therefore, when this signal is passed through the variable gain filter, the effect is to introduce distortion, in the form of under-shoot and over-shoot, into the signal. This distortion occurs because the rise time of the signal is already sufficiently fast so that the effect of the filter—which amplifies the high frequency components of the signal, precisely those components which form the transition in the step response—is to overamplify the high frequency components. This effect is illustrated with reference to FIG. 4b, which shows the signal 15' which results from passing step response 14' through the filter. As can be seen, the effect of the filter is to introduce under-shoot and over-shoot into the signal. Conversely, it can be shown that optimizing the equalizer for operation at plane 6 will result in inadequate compensation at plane 6', reducing the ability of the system to render narrow target features.

The distortion resulting from overcompensation can, as noted previously, lead to improper digitization of the analog signal. The reason is that the signal processing subsystem—that portion of the scanner that normally performs the digitization function—typically operates by detecting transitions in the analog signal (or a derivative thereof) across a known threshold level. For example in U.S. Pat. No. 4,000,397, and in co-pending U.S. patent application Ser. No. 07/786,290, filed Nov. 1, 1991 (both of which are incorporated herein by reference) a signal processing subsystem is described which detects zero crossings of a second derivative of the signal, which are qualified only when the first derivative of the signal exceeds a threshold voltage. The distortion introduced by overcompensation may erroneously cause the second derivative to reach zero, and if the first derivative amplitude is sufficiently high, may lead to false transitions in the resultant digital signal.

Figure 4B:
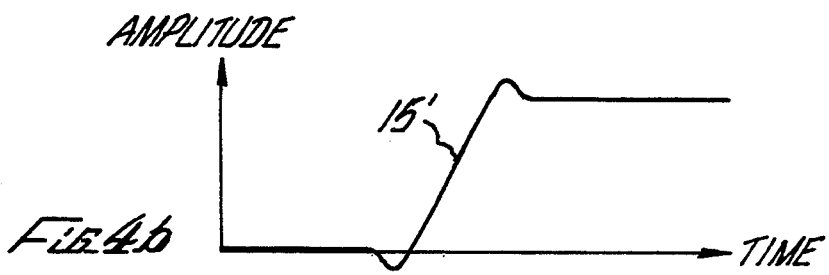
Figure 5:
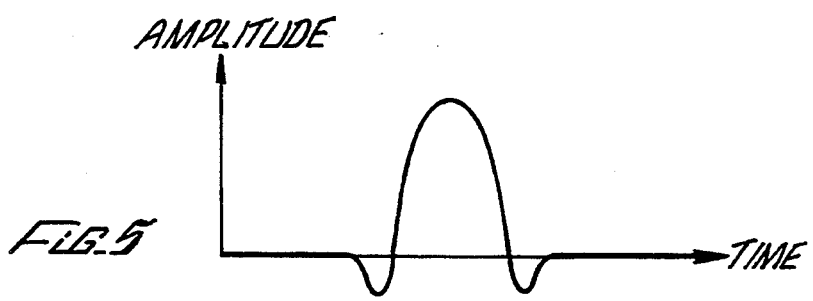
FIG. 5 is a graph illustrating how overcompensating can distort the resultant differentiated signal.
Figure 6:
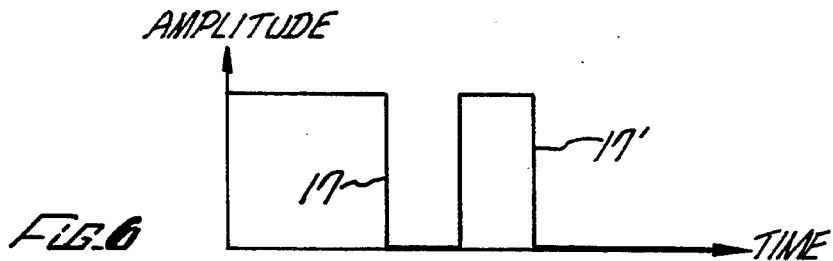
FIG. 6 is a graph illustrating how overcompensating can lead to false transitions in the resultant digital signal.
Figure 1A:
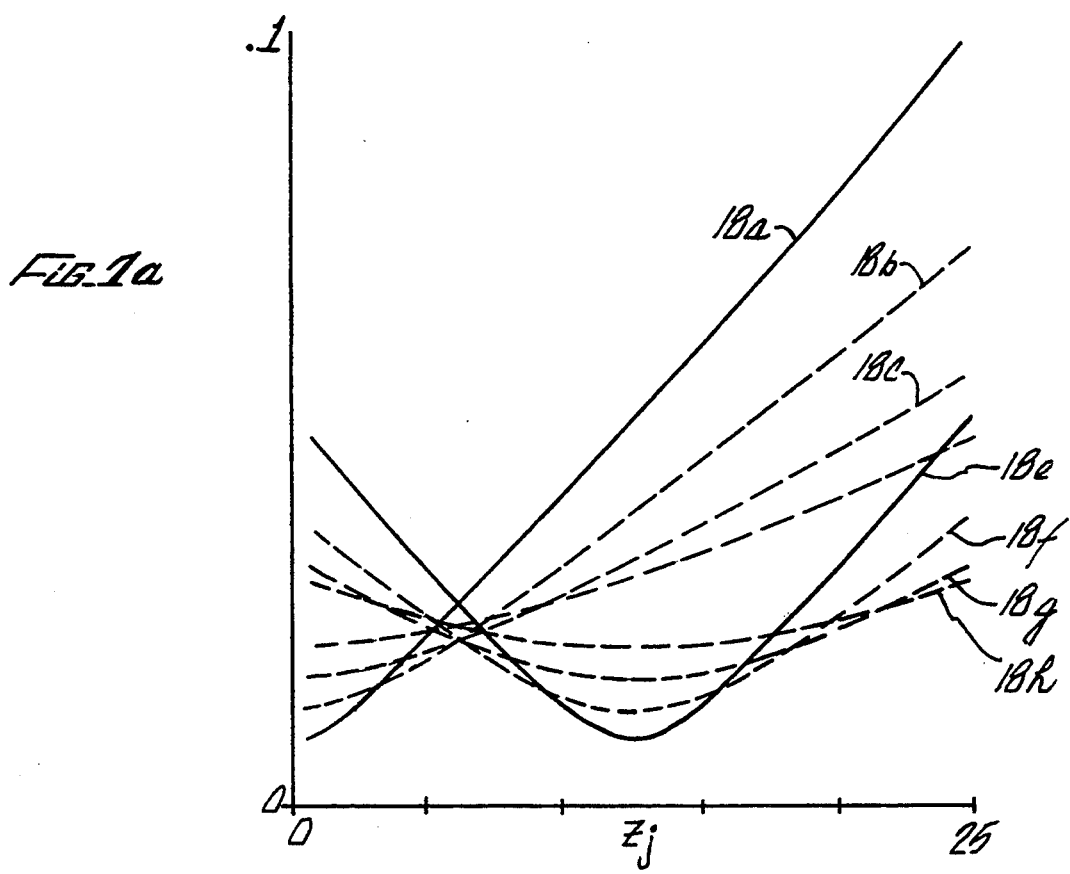
Figure 1B:
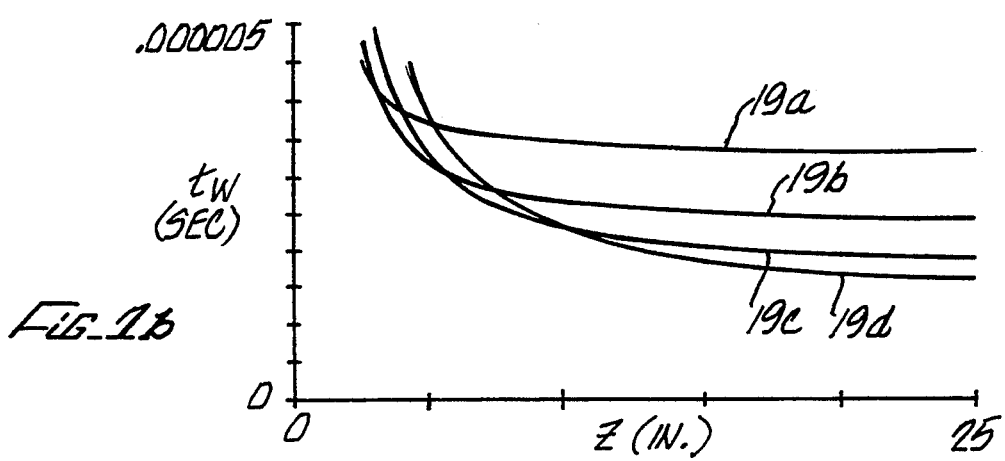
Figure 1C:
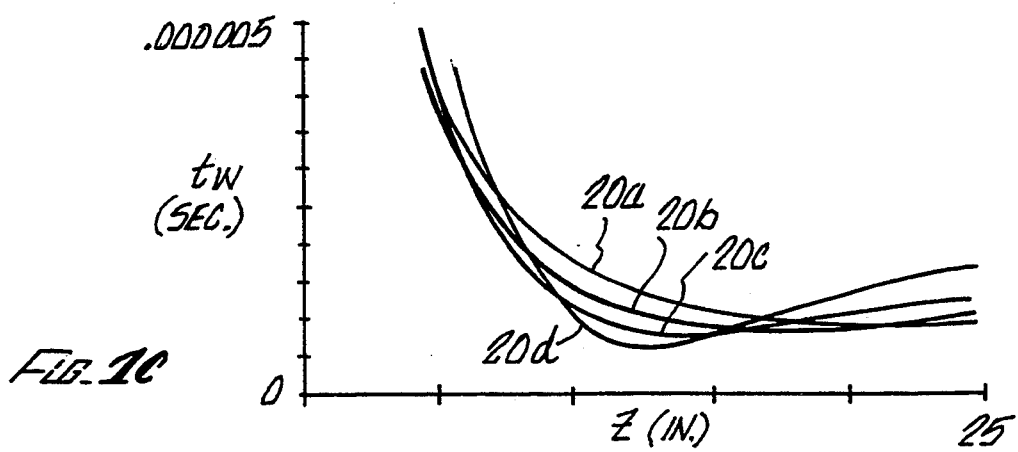

This effect is illustrated with reference to FIG. 5, which shows the derivative of the overequalized signal 15' of FIG. 4b, and FIG. 6, which shows the resultant digital signal. As shown, two false transitions 17 and 17' respectively, have been improperly introduced into the digital signal.

To eliminate the aforementioned problem, in a first preferred embodiment, an optical scanner is provided in which the opto-mechanical portion thereof is configured such that the width of the time domain impulse response remains approximately constant over the desired scan volume. Doing so enables equalization for large spot sizes to be accomplished while avoiding the problems of overcompensation and undercompensation at certain points within the scan volume.

It may be noted, for example, that the diameter of a Gaussian beam cross-section, as a function of distance along the beam axis, is given by:

$$d_{spot} = \sqrt{d_0^2 + \left(4\lambda \frac{z-z_0}{\pi d_0}\right)^2} \quad (1)$$

where $d_{spot}(z)$ = beam diameter (or spot size), $d_0$ = beam diameter at waist, $\gamma$ = beam wavelength, $z$ = distance from source along beam axis, and $z_0$ = distance from source to waist.

Thus as z becomes large relative to $z_0$, the beam diameter increases approximately linearly as a function of distance.

Further, it can readily be shown that the pulse width of the impulse response at a location z along the beam path is:

$$t_z = \frac{d_z}{V_z} \quad (2)$$

where $d_z$ = the beam diameter at the location z along the beam path, measured in the direction of spot motion in the cross section defined by the target plane, and $V_z$ = the linear spot velocity at the location z along the beam path.

Thus, to obtain an approximately constant impulse response anywhere within the scan volume, the ratio of the beam diameter to the linear spot velocity should remain approximately constant along the beam axis over the scan volume.

The time domain impulse response pulse width of prior art devices varies widely over the scan volume. The pulse width in the scan volume of such a prior art device might vary 160% from its value at the window. In contrast, for a scanner utilizing the present invention, the time domain impulse response pulse width remains approximately constant, generally varying less than ±25% (with 10–20% being a preferred range) over the useful scan volume, relative to its value at the window. Operating within this range, the desired goal of equalizing the system with a single, time-invariant filter while effectively eliminating under-compensation or overcompensation, typically becomes achievable. Exact quantification of the extent of variation from absolute constancy allowable may be impractical for all applications envisioned, as it depends on the degree of equalization used, characteristics of the opto-mechanical system (such as, beam size, beam power, depth of field), required minimum renderable feature size, system noise characteristics, and other application specific characteristics.

One method in which the time domain impulse response pulse width can theoretically be held approximately constant is by positioning the beam waist 6 (reference FIG. 1) at the optical center of rotation 3a of the scanning mirror 3 (hereinafter referred to as "center of rotation"). By positioning the beam waist 6 in this manner, the spot size of the beam will diverge throughout the scan volume, with the diameter approaching an asymptote which crosses through the intersection of the beam axis and the beam waist. Thus, as the distance from the waist location increases, the spot diameter becomes approximately proportional to the distance from the beam waist. Provided the angular velocity of the scanning mirror 3 is held approximately constant, the linear spot velocity will also increase linearly, proportional to the distance from the center of rotation. Since the numerator and denominator in the aforementioned equation (2) are both increasing approximately linearly, the ratio—which, as stated, represents the pulse width of the impulse response—will remain approximately constant.

It should be appreciated that by positioning the beam waist in the above-mentioned manner, the spot size will actually be larger within the scan volume than would otherwise be the case. Therefore, given the previously-discussed disadvantages of a larger spot size (i.e., reduced amplitude modulation depth over narrow element portions, need to compensate therefore, and resulting overcompensation or undercompensation at some points within the scan volume using existing methods), it would appear disadvantageous to place the beam waist 6 in such a position (i.e., at the center of rotation). However, as this positioning provides for a near constant impulse response width, more uniform equalization throughout the scan volume is realized despite the larger spot size. Consequently, the results achieved by positioning the beam waist in this manner are unexpected.

Despite this advantageous result, however, for practical reasons, relating to the divergence properties of Gaussian beams and other factors related to spot size as explored below, it is desirable to offset the beam waist from the center of rotation. Positioning of the beam waist right at the center of rotation of the scanning mirror could result in a spot size within the scan volume which is too large for successful equalization because a great deal of high-frequency boost would be required to make rendition of narrow features possible; and, filters having such characteristics (i.e., low damping ratio) tend to have poor noise performance and are difficult to stabilize. It has been found, however, that satisfactory results may be achieved, in accordance with the objectives of this embodiment, by moving the beam waist between the center of rotation of the scanning mirror and the beginning of the scan volume—e.g., in that area identified with letter y in FIG. 1.

The offset placement of the beam waist from the center of rotation allows the beam waist location to be maintained within the scanner housing (i.e., the preferable beam waist position being prior to the scanner window along the beam path) though the beam waist does not absolutely have to be placed within the scanner housing. Consequently, the time domain impulse response width remains approximately constant (though constancy is somewhat diminished compared to that realized with no offset) at points beyond the window, within the scan volume, while the diameter at any particular point within the scan volume is smaller than if the beam waist were placed at the exact center of rotation of the scanning mirror.

The relationship between offset and the corresponding tradeoff in constancy of impulse response can best be understood with reference to FIGS. 7a–7c. Each of these curves plots a value—whether the beam diameter or the temporal impulse response pulse width for the opto-mechanical system—as a function of the distance z along the beam path in an exemplary bar code scanner, where, for each figure, the z=0 location is the center of rotation of the facet wheel. These curves were plotted assuming the light source is a laser emitting at a wavelength of 670 nanometers, and a facet wheel rotation rate of 5500 RPM. It should be appreciated that these curves could change with different assumptions. For all of these curves, it is assumed that the window—through which the beam exits the housing—is appropriately situated along the z-axis so that the time domain impulse response width of the opto-mechanical system is approximately constant thereafter.

Turning to FIG. 7a, this figure illustrates a family of curves, identified with numerals 18a–18h, where each curve in the family corresponds to a particular value of the beam diameter at the beam waist, and plots the beam diameter as a function of z, the distance along the beam path. The curves identified with reference numerals 18a, b, c, and d represent implementations where the beam waist is located at about the z=0 (center of rotation) location, while the curves identified with reference numerals 18e, f, g, and h represent implementations where the beam waist is located at about the z=12.5 in. (31.75 cm) location. The correspondence between each of these curves and the beam diameter at the beam waist is given by the following table:

| Identifying Numeral | Beam Diameter at Waist |
| --- | --- |
| z = 0 | |
| 18a | 8.70 mil (.221 mm) |
| 18b | 12.00 mil (.305 mm) |
| 18c | 16.00 mil (.406 mm) |
| 18d | 20.00 mil (.508 mm) |
| z = 12.5 in (31.75 cm) | |
| 18e | 8.70 mil (.221 mm) |
| 18f | 12.00 mil (.305 mm) |
| 18g | 16.00 mil (.406 mm) |
| 18h | 20.00 mil (.508 mm) |

Turning to FIG. 7b, this figure illustrates a second family of curves, identified with numerals 19a–19d, where, again, each curve in the family corresponds to a particular value of the beam diameter at the beam waist, and plots the temporal impulse response width as a function of z, the distance along the beam path, in the case where the beam waist is situated at about the center of rotation (z=0) of the scanning mirror. The correspondence between each of these curves and the beam diameter at the beam waist is given by the following table:

| Identifying Numeral | Beam Diameter at Waist |
| --- | --- |
| 19a | 8.70 mil (.221 mm) |
| 19b | 12.00 mil (.305 mm) |
| 19c | 16.00 mil (.406 mm) |
| 19d | 20.00 mil (.508 mm) |

FIG. 7c illustrates a family of curves, identified with numerals 20a–20d, where each curve in the family corresponds to a particular value of the beam diameter at the beam waist, and plots the temporal impulse response width as a function of z, the distance along the beam path, in the case where the beam waist is situated about 12.5 in. (31.75 cm) downstream from the optical center of rotation of the scanning mirror along the beam path. The correspondence between each of these curves and the beam diameter of the beam waist is given by the following table:

| Identifying Numeral | Beam Diameter at Waist |
| --- | --- |
| 20a | 20.00 mil (.508 mm) |
| 20b | 16.00 mil (.406 mm) |
| 20c | 12.00 mil (.305 mm) |
| 20d | 8.70 mil (.221 mm) |

The curves illustrated in FIGS. 7a–7c illustrate the tradeoff between constancy and absolute magnitude of the temporal impulse response pulse width, and, correspondingly, spot size. Maintaining a constant temporal response pulse width throughout the scan volume (for example, curve 19a of FIG. 7b) insures that the system may theoretically be equalized exactly regardless of target position along the z axis. However, the beam size in this case (curve 18a in FIG. 7a) is very large for large z.

If, on the other hand, impulse response constancy is sacrificed slightly by moving the beam waist closer to the scan volume, a decrease in beam size for relevant values of z [e.g., 12.5 inches (31.75 mm)$<z<$25 inches (63.5 cm)] may be achieved (as seen in curve 18c of FIG. 7a, for example). Furthermore it is seen (curve 20c in FIG. 7c, for example), that over this scan volume, the pulse width is substantially less than that of the previous example. Because of this reduction in pulse width, it becomes possible to render narrower features more accurately and reliably, without necessitating the use of filters having very low damping ratio. Utilizing curves of this type, the system parameters (e.g., beam diameter at waist and beam waist location) may be optimized, to maintain the impulse response width approximately constant while reducing its magnitude and that of the spot size, for desired applications.

In a preferred construction, the beam waist may be positioned within the housing (i.e. prior to the scanner window). The actual scanner window location is dictated substantially by physical parameters, but there is a certain amount of flexibility in these physical parameters. A system may readily be designed locating the beam waist at various locations, including (1) within the scanner housing (that is, at a position on the beam axis prior to or at the scanner window), (2) at the scanner window, or (3) near the scanner window [e.g. within $\pm \frac{1}{2}$ in (1.27 cm) thereof].

A primary advantage of an approximately constant impulse response is the improved ability to electrically reduce the effective pulse width, making it possible to accurately render small target features over a larger range. However, a secondary advantage is that the benefits of a larger spot, such as the ability to filter out paper noise, are retained along paths other than the path over which equalization is performed (i.e., the direction of spot motion along the target). This secondary advantage is particularly important since, along the vertical edge of an element (e.g., a bar), noise can result from what is typically a somewhat jagged and ill-defined edge. A large spot can filter out this noise since the noise along the edge is effectively integrated over the spot area. Since equalization is performed only in one dimension, along the scanning path (i.e., the path the spot traverses over the target), which is typically different from the vertical edge of an element, a large spot will effectively filter out this noise in this embodiment. A large spot may also be beneficial since it will average out some of the speckle noise introduced by the laser. The speckle (a non-linear effect) reduction occurs before equalization (a linear operation). Therefore the equalization process does not reintroduce speckle noise into the signal.

It should be appreciated that other one-dimensional or two-dimensional embodiments, discussed in greater detail further on, are possible. Exemplary of such an implementation is one in which a one-dimensional or two-dimensional image of a target is captured, processed, and scanned "virtually" by a computer program or the like which causes a "virtual" spot to traverse the image of the target, rather than physically scanning the target itself, thus providing sufficient flexibility such that the scanning (and hence equalization) path can be arbitrarily chosen to be as different as necessary from the path over which it is desired to average out noise.

Alternative embodiments for improving depth of field are possible. In one example, beam parameters other than the temporal impulse response pulse width are held approximately constant over the scan volume to improve the ability of equalizing for the effect of a large spot size. Other techniques may also be utilized to maintain the approximate constancy of the temporal impulse response pulse width over the scan volume.

In a second embodiment, for example, the time domain impulse response width is made to remain approximately constant by holding the beam diameter and the spot velocity both approximately constant over the desired scan volume. To accomplish the latter objective, the distance between the scanner and target can be automatically determined, such as, for example, by utilizing the focusing error-sensing optical subsystem described in co-pending U.S. patent application Ser. No. 07/844,278, Reddersen et al., filed Mar. 2, 1992, herein incorporated by reference. Once this distance is determined, this distance value is utilized to adjust the rotational speed of the scanner motor so that the linear spot velocity remains approximately constant throughout the scan volume. The former objective can be achieved by using a beam which has an approximately constant diameter over the scan volume. One way such a beam can be formed is through proper utilization of an optical element known as an axicon, optionally in conjunction with a slit to eliminate the outer concentric rings generated by the axicon, such as is discussed in U.S. Pat. No. 5,080,456, herein incorporated by reference.

Additionally, in a third embodiment, to be further described in detail later herein, the parameter which remains approximately constant is the beam power.

Alternate one-dimensional or two-dimensional embodiments are also possible. In accordance with such a fourth class of embodiments, one manner of implementation is to scan and process one-dimensional or two-dimensional images of the target by simply scanning a laser beam across the target in a one-dimensional or two-dimensional pattern, respectively, forming an electrical representation of the collected signal, similar to the implementation discussed in European Publication No. 0 384 955 herein incorporated by reference. In another such implementation, a one-dimensional or two-dimensional image of the target is obtained directly by utilizing a one-dimensional or two-dimensional imaging device such as a CCD, video camera, or the like, similar to that described in European Publication No. 0 385 478 also incorporated herein by reference.

Imaging devices using lenses, such as video cameras (vidicons), CCD cameras and the like, are not well suited to edge detection applications where large depth-of-field is required, because the range of focus is relatively short. Automatic focussing is one means to alleviate this difficulty, but an accurate target distance measurement means, and a means to alter focus location, are required.

Figure 16:
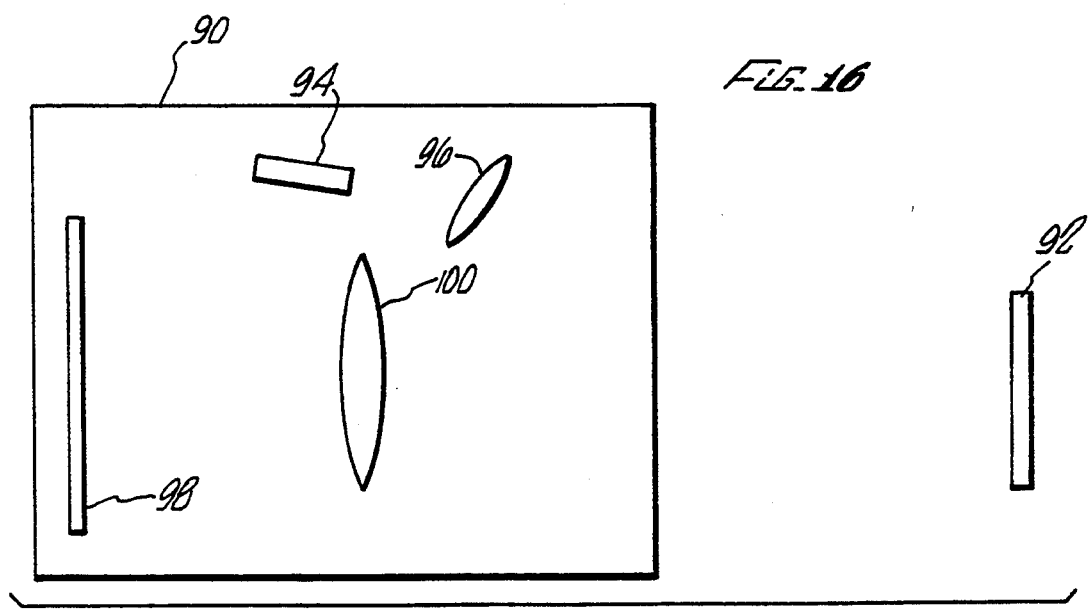
FIG. 16 illustrates an alternate embodiment utilizing an imaging device.

An alternative, analogous embodiment of the present invention is shown in FIG. 16 which depicts an imaging system 90 for use in capturing an image of the target 92. A light source 94 and optics 96 are configured such that the light is incident on the target 92 and may be detected by imaging device 98 (e.g., a CCD). An optical element 100 is utilized to enhance focus characteristics. In a preferred implementation of this embodiment the optical element 100 is a "soft-focus" lens, which for purposes of this disclosure is defined to be a lens with nearly constant optical impulse response (known as the "point spread function") as a function of object distance. Examples of this type include commercially available axicon-like imaging lenses, under-corrected or over-corrected (spherically aberrated) lenses, and lenses with chromatic aberration used with polychromatic illumination. Analogously to the previous embodiments, quality of mid-field focus is sacrificed slightly to achieve near-invariance of focus throughout the scan volume. This invariance in turn allows the use of a single, time-invariant equalizer without risk of under-equalization or over-equalization for certain imager-to-target distances.

As noted previously, one method of processing such a multi-dimensioned image, once captured, is to "virtually" scan it. An imaging device, which may, for example, comprise an array of photodetectors, can be used to both sense and electronically scan an image. Such an array of photodetectors could represent the image in pixel-like manner, and, by individually addressing each pixel (e.g., photodetector), the image, once captured, could be electronically scanned simply by reading out the pixels in an order determined by a desired scan pattern. This approach eliminates the need for intermediate video image storage, such as a frame buffer. A soft-focus lens could be used with a device of this type, in the manner described in the previous paragraph, to increase the volume over which small features can be accurately rendered. Other similar implementations are possible using conventional CCD, CID or vidicon sensing devices with frame storage to allow pixels to be individually addressed.

It is not necessary to process an image after it is stored. The equalization can be applied in real time to the signal as it emerges from the image sensor. Sensors are available that provide both one-dimensional (raster) signals as well as two-dimensional signals. These signals can be equalized by one-dimensional or two-dimensional filter functions in accordance with the teachings of this invention.

Figure 8:
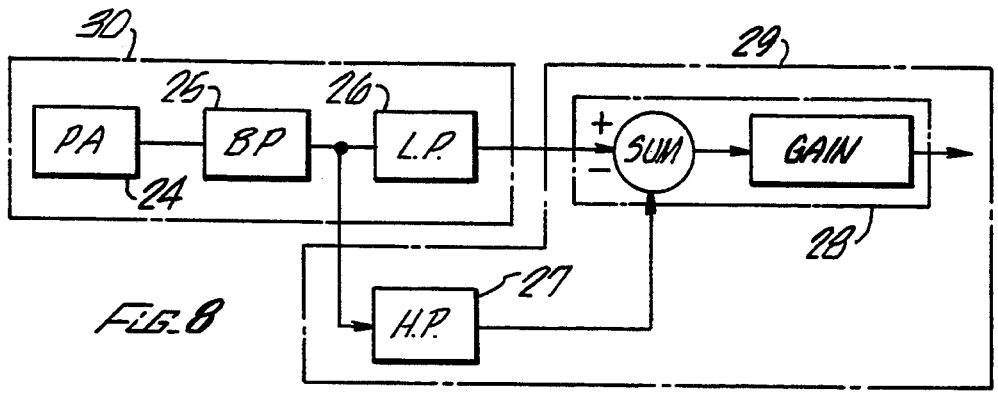
FIG. 8 is a block diagram of an electrical system which includes a compensation, or equalization, subsystem.

Turning back to the one-dimensional embodiment discussed at the outset, embodiments of an electrical system for amplifying and filtering the analog signal while equalizing to reduce the temporal impulse response pulse width (and, simultaneously, the effective spot size) will now be described. A block diagram of a first embodiment of such a system is shown in FIG. 8. As shown, the system comprises a signal processing subsystem 30 (for amplifying and filtering the analog signal) and an equalization subsystem 29 (for equalizing to reduce temporal response pulse width). The signal processing subsystem 30 comprises a pre-amplifier 24, a bandpass filter 25, and a low-pass filter 26. The equalization subsystem 29 comprises an high-pass filter 27 and a sum/gain stage 28. A differentiator and gating and thresholding electronics (not shown) are also utilized to convert filtered data into a serial digital data stream; in this embodiment these elements are located downstream from the sum/gain stage 28.

Figure 9:
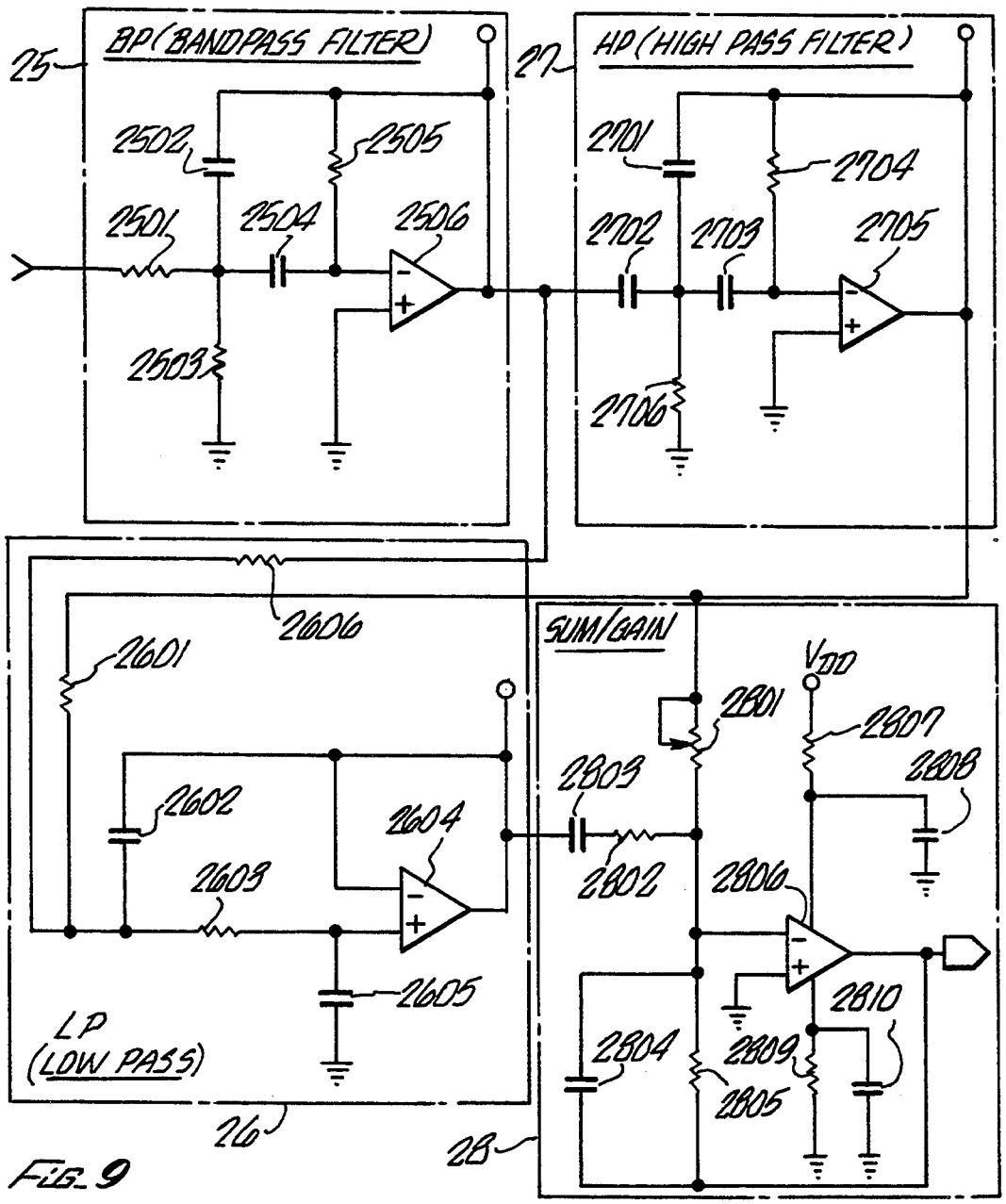
FIG. 9 is a detailed circuit diagram of the system of FIG. 8, excluding the preamplifier (PA)

A detailed circuit diagram of the equalization subsystem 29 (and the relevant portion of the signal processing subsystem 30) of FIG. 8 is provided in FIG. 9. As shown, in this embodiment, the bandpass filter 25 comprises resistor 2501, capacitor 2502, resistor 2503, capacitor 2504, resistor 2505, and operational amplifier 2506, all coupled together as shown.

The low-pass filter 26 in this embodiment comprises resistor 2601, capacitor 2602, resistor 2603, operational amplifier 2604, capacitor 2605, and resistor 2606, all coupled together as shown.

The high-pass filter 27 in this embodiment comprises capacitor 2701, capacitor 2702, capacitor 2703, resistor 2704, operational amplifier 2705, and resistor 2706, all coupled together as shown.

Finally, the sum/gain stage 28 in this embodiment comprises potentiometer 2801, resistor 2802, capacitor 2803, capacitor 2804, resistor 2805, operational amplifier 2806, resistor 2807, capacitor 2808, resistor 2809, and capacitor 2810, all coupled together as shown.

The signal processing subsystem 30 is advantageously a derivative-based signal processing system in which the bandpass filter 25 forms the first derivative of the analog signal, and the low-pass filter 26 filters out unwanted high frequency noise. A second high pass filter (not shown) and gating and threshold electronics (not shown) located downstream of the summation gate function to form the second derivative of the analog signal arid to form a digital signal by creating digital transitions at zero crossings of the second derivative signal when the first derivative exceeds a predetermined threshold level. Additional details regarding the design and operation of such a derivative based signal processing system are available in U.S. Pat. No. 4,000,397 and pending U.S. patent application Ser. No. 07/786,290, (previously incorporated herein by reference).

Turning to the equalization subsystem 29, as mentioned, the function of this subsystem is to amplify the high-frequency components of the analog signal (or a derivative thereof) to compensate for the effect of large spot size. In this particular embodiment, equalization is performed on the first derivative of the analog signal, although it should be appreciated that embodiments are possible where equalization is performed directly on the analog signal itself.

In order to insure that the relative positions of the target edges are preserved as they pass through the electro-optical system, two requirements must be met. First, the width of the combined electro-optical system impulse response must be sufficiently small to ensure that adjacent edges do not interfere. This requirement is met by making the spot diameter (as imaged on the target) as small and as consistent as possible throughout the scan volume, and then increasing the magnitude of the high frequency response until the smallest target feature is rendered accurately. Second, the phase response of the electro-optical system must be approximately linear (i.e. the group delay response must be approximately constant) over the passband. This constant group delay insures that all edges will be delayed by an equal amount as they pass through the electrical system, regardless of position with respect to neighboring edges.

In this example of the first embodiment it is assumed that the beam cross section is symmetrical. A low-pass filter polynomial, having linear or nearly linear phase response but without high frequency boost, is used. Appropriate examples of such filters include the Bessel, Linear Phase with Equiripple Error, and Transitional Gaussian families. Additional information on the design of such filters is provided in the book entitled "Electronic Filter Design Handbook", Arthur B. Williams, published 1981 by McGraw-Hill, Inc., herein incorporated herein by reference. Referring to FIG. 8, the signal processing subsystem 30 is designed in such a way that the poles of its transfer function match those of the desired filter polynomial. Thus the electrical system has linear or nearly linear phase response in its passband without the equalization subsystem 29 in place. Next, the high pass filter 27 is designed such that its poles match those of the low pass filter 26. Matching the pole locations of these two filters insures that the composite transfer function will have the same phase response as the low pass filter 26 alone.

As an example, for a low pass filter having a transfer function of the form:

$$A_{LP} = \frac{K_{LP}}{as^2 + bs + 1} \quad (3)$$

an appropriate parallel high pass filter would have the following transfer function:

$$A_{HP} = \frac{K_{HP}s^2}{as^2 + bs + 1} \quad (4)$$

The high pass term causes the composite magnitude response to increase with frequency, as desired, reducing the system impulse response pulse width. (To achieve boost at high frequencies it is necessary to subtract the high pass and low pass terms, since the high pass term has a phase shift of 180°.) Since the lowpass and highpass filters are coupled at the sum/gain stage to inputs of opposite polarity, the composite response is given by:

$$A_{COMP} = \left( \frac{K_{LP} - K_{HP}s^2}{as^2 + bs + 1} \right) \quad (5)$$

Substituting s=jω, the numerator is factored into:

$$N = \quad (6)$$

$$K_{LP} - K_{HP}(j\omega)^2 = K_{HP}\left(j\omega + \sqrt{\frac{K_{LP}}{K_{HP}}}\right)\left(-j\omega + \sqrt{\frac{K_{LP}}{K_{HP}}}\right)$$

and the phase of the numerator is given by:

$$\theta_N = \arctan\left(\frac{0}{-K_{HP}}\right) + \quad (7)$$

$$\arctan\left(\frac{\omega}{\sqrt{\frac{K_{LP}}{K_{HP}}}}\right) + \arctan\left(-\frac{\omega}{\sqrt{\frac{K_{LP}}{K_{HP}}}}\right) = 0$$

Preferably, the overall system of FIG. 8 is configured to have a symmetric time domain impulse response. Since a filter having a symmetrical time domain impulse response also has a linear phase response and constant group delay in the passband, these terms can be used interchangeably. By contrast, the equalization filter disclosed in European Publication No. 0 433 593 is not disclosed as being symmetric. The disadvantage of an asymmetric filter is that it delays high frequencies to a different degree than low frequencies, which can cause pattern-dependent distortion of relative edge positions.

It should also be appreciated that embodiments are possible using other forms of symmetric filters in the equalization and/or signal processing subsystems, including the analog implementations mentioned previously (Bessel, Linear Phase with Equiripple Error, Transitional Gaussian, etc.), transversal (tapped delay line) filters, and finite impulse response digital filters, provided the same are configured with symmetrical coefficients, or are delay-equalized filters.

In one such embodiment, the linear phase equalization filter is implemented as an approximation to an inverse filter. The filtering (or smoothing) caused by the convolution of the printed features with the scanning spot can be compensated for by the application of a filter that has a transfer function equal to the inverse of the transfer function of the spot. This operation is commonly called de-convolution, and may be performed on one-dimensional or two-dimensional signals (images). In the case of a Gaussian spot intensity profile, the inverse filter is an inverted Gaussian. This is because the Fourier Transform of a Gaussian is another Gaussian. This filter function can be approximated in either FIR or IIR form by any number of well known means. Additional information on the design of such filters is provided in the book entitled "Theory and Application of Digital Signal Processing", by Lawrence Rabiner and Bernard Gold, published in 1975 by Prentice Hall, Inc., herein incorporated by reference.

Figure 15A:
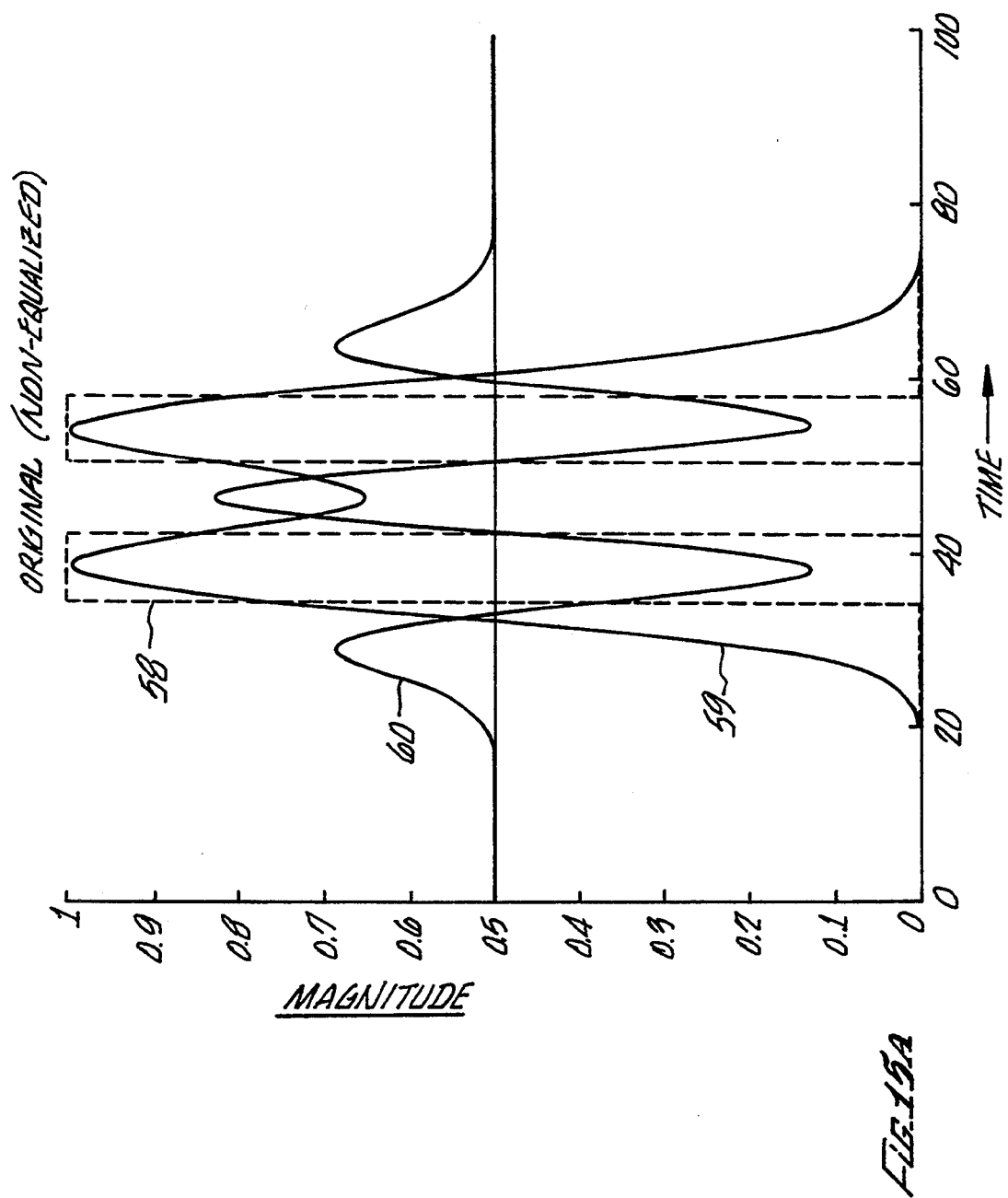

A specific example of such an embodiment where the linear phase equalization filter is implemented as an approximation to an inverse filter is illustrated in FIGS. 15a and 15b. In FIG. 15a, representations of the target reflectance, 58, the reflected light as a function of time, 59, and the second (time) derivative of the reflected light, 60, are shown. In this case, the spot size is significant relative to the feature size, thus, the modulation depth of curve 59 is relatively poor. In addition, the second derivative zero crossings, which are typically used to locate target edges, accurately render the two center edges but the outer two edges are displaced by about 25% of the target width. In FIG. 15b a 3 point FIR equalizer, with the coefficients {−0.5 1.02 −0.5} and a delay value of 750 nanoseconds between taps is employed. (It should be clear that other length filters and differing values of the coefficients and delay elements are possible and that appropriate values are determined by details such as spot shape, spot size, and spot velocity of a given scanner.) Here the modulation depth (curve 61) is much improved and the second derivative (curve 62) zero crossing locations more accurately reflect the edge locations of the target. This procedure is made more practical by the use of the present impulse invariant response system, since only one filter need be designed and implemented to successfully restore the signal over the entire scan volume.

Figure 10A:
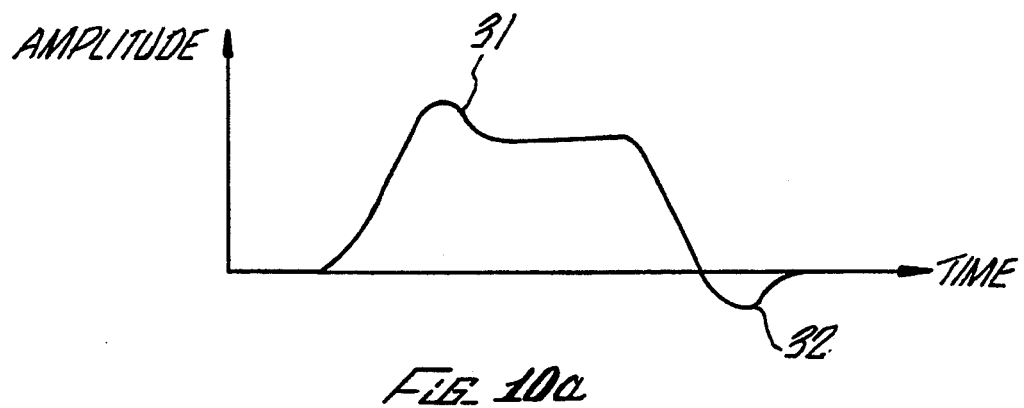
FIGS. 10a-10c are graphs illustrating overequalized asymmetric (a), overequalized symmetric (b), and properly-equalized symmetric (c) overall system time domain step responses.
Figure 10B:
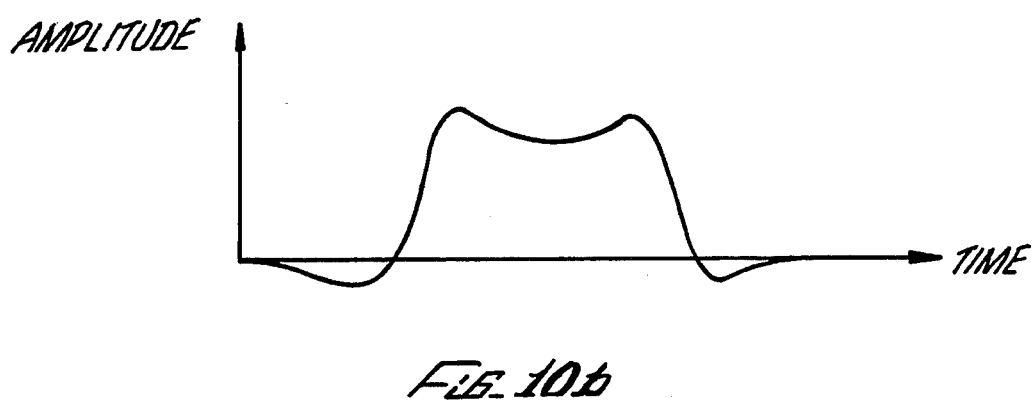
Figure 10C:
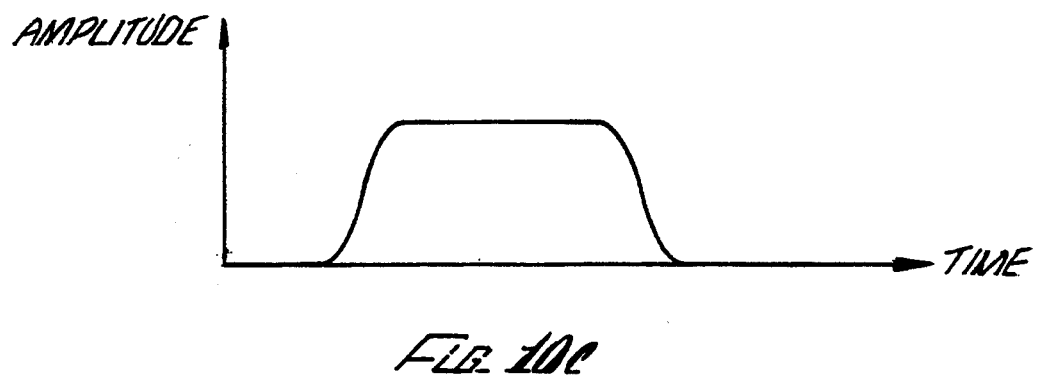

The disadvantages of over-equalization can be illustrated with reference to FIGS. 10a–10c, which illustrate the overall impulse response of the combined opto-mechanical and electrical systems. FIG. 10a shows the overall impulse response with no equalization, and with a filter whose bandwidth is large enough to insure that its effect upon the overall impulse response is negligible. It is desired to reduce the width of this pulse, to reduce its effect on pulses associated with adjacent edges. FIG. 10b illustrates an adverse effect of over-equalization, i.e., additional pulses which could be misconstrued as additional edges. FIG. 10c illustrates the overall impulse response of a properly equalized system, where the objective of pulse slimming to reduce inter-target interference has been achieved, without creating significant additional peaks.

The time domain impulse response for an electrical system characterized by a transfer function of the form identified above is illustrated in FIG. 11a. Each of the curves illustrated corresponds to a different value of K, i.e., a different degree of equalization (where $K=K_{HP}/K_{LP}$). The specific correspondence is given by the following table:

| Identifying Numeral | Value of K |
|---|---|
| 33a | 1.5 |
| 33b | 1.0 |
| 33c | 0.5 |
| 33d | 0 |

As can be seen, as the value of K, and hence the degree of equalization, decreases, the degree of overshoot and undershoot of the response decreases, although, as can be seen, the curves remain symmetrical.

It should be appreciated that to achieve proper equalization, the electrical system should generally exhibit overshoot with a symmetrical impulse response, as illustrated in FIG. 11a. This overshoot is necessary to reduce the duration of the opto-mechanical system impulse response, such that the effect of each pulse on adjacent pulses is minimized. The overall system response, on the other hand, should have little or no overshoot, as illustrated in FIG. 10c, since overshoot peaks could be misinterpreted as transitions.

Figure 11B:
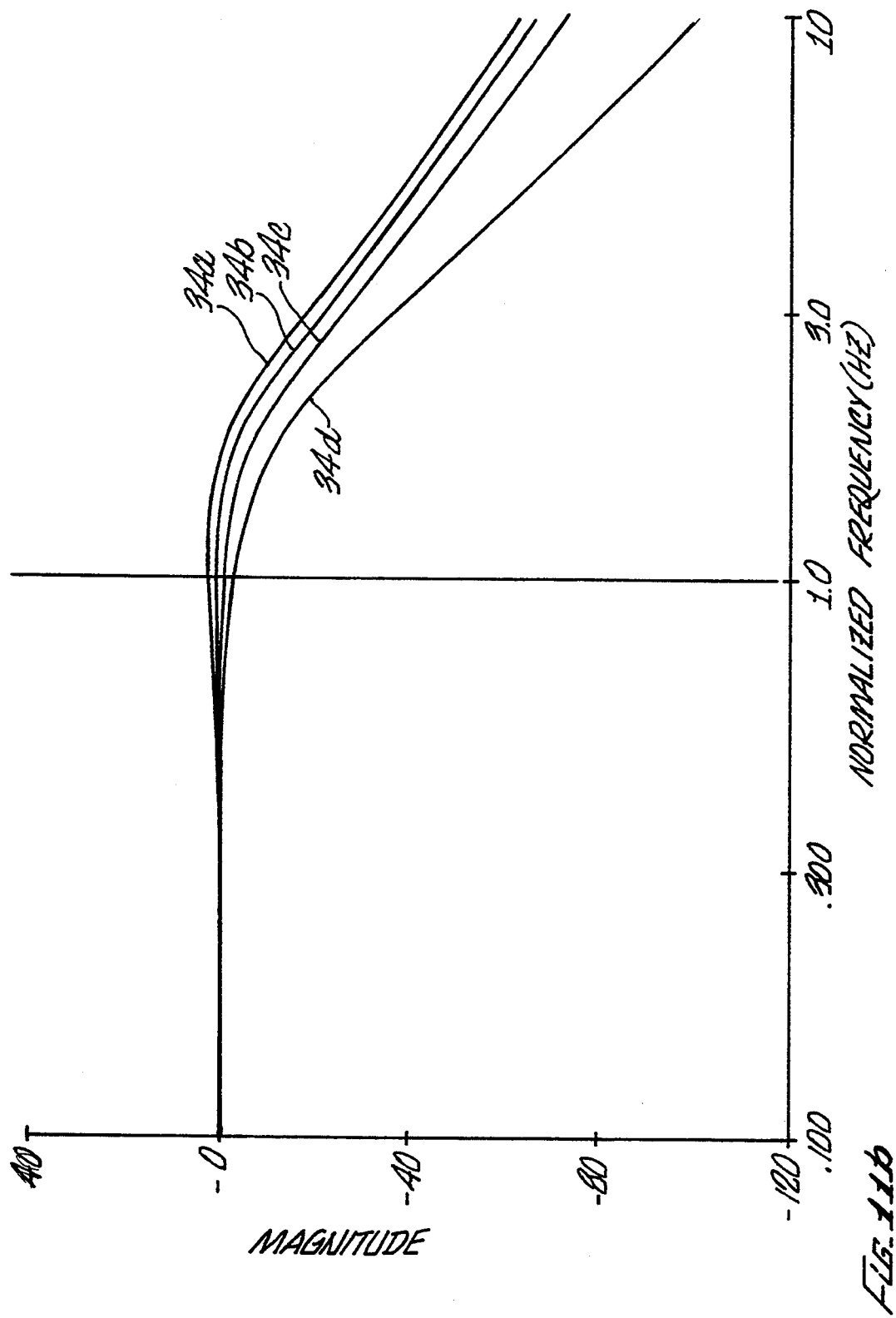

Turning to FIG. 11b, this figure illustrates the frequency domain magnitude response of the electrical system, normalized such that the 3 dB point of the K=0 (identified with numeral 34d) curve is located at 1 Hz. Again, each of the curves illustrated correspond to a different value of K, and, therefore, a different degree of equalization. The specific correspondence is given by the following table:

| Identifying Numeral | Value of K |
|---|---|
| 34a | 1.5 |
| 34b | 1.0 |
| 34c | 0.5 |
| 34d | 0 |

As can be seen from this Figure, the degree of amplification at the high frequencies decreases as the degree of equalization decreases.

Figure 11C:
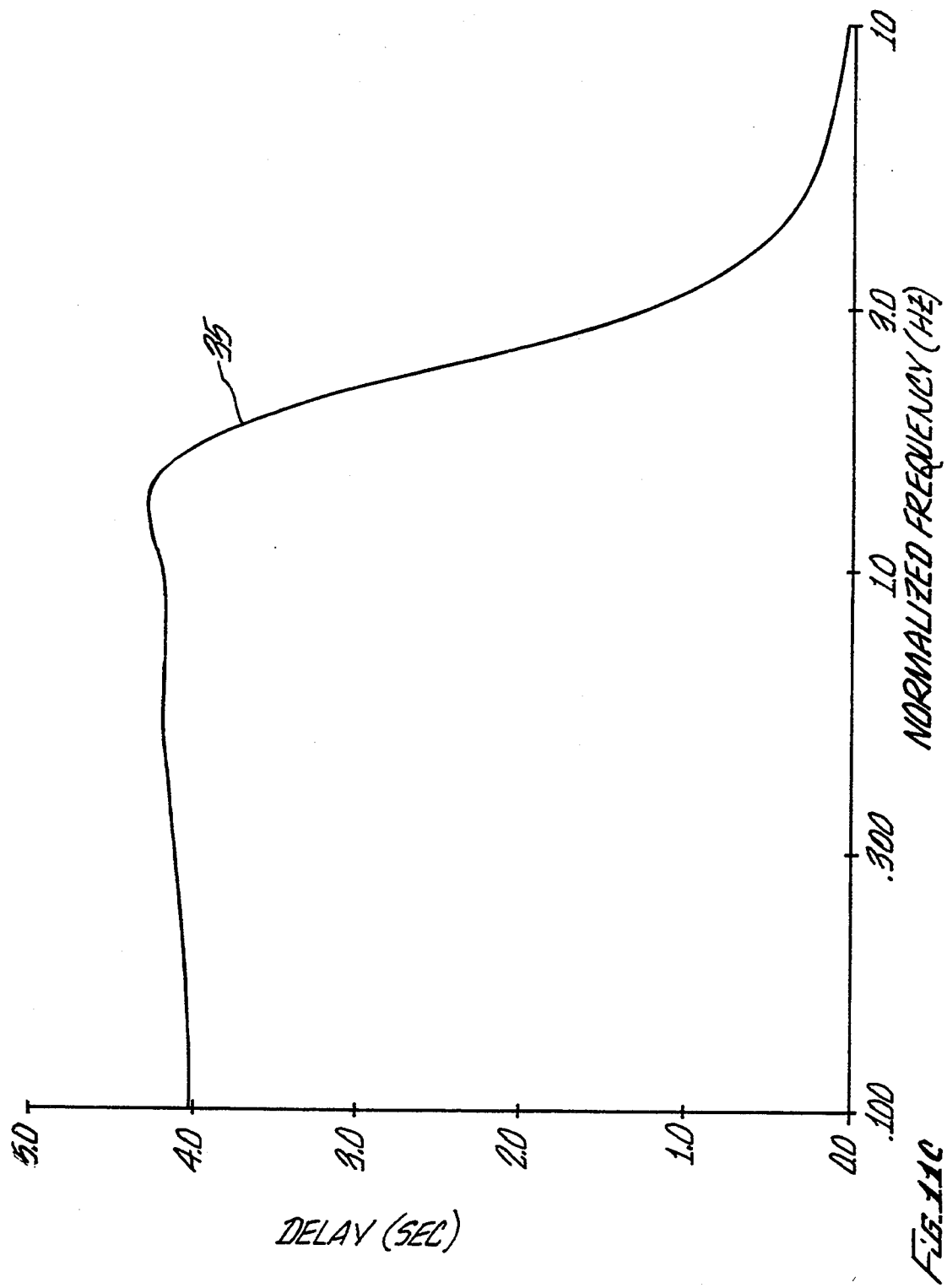

Finally, turning to FIG. 11c, this figure illustrates the frequency domain group delay of the electrical system, again normalized such that the 3 dB point of the curve is located at 1 Hz.

Unlike the previous two figures, only a single curve, identified with numeral 35, is illustrated, insofar as the curves for K=0, 0.5, 1.0, and 1.5 are identical. As can be seen, within the passband of interest, the group delay is approximately constant for all values of K.

In an attempt to quantify a preferred range for the variance of group delay, the maximum value of group delay may be held to within 15% over its minimum value through the scan volume. A more narrow range may be preferred with 6 to 8% currently being the preferred narrow range. Maintaining the maximum group delay to be no greater than 6-8% higher than the minimum value over the scan volume has been shown to allow for sufficient selectivity for equalization while minimizing the aforementioned edge distortion.

Embodiments using other forms of equalization and/or signal processing subsystems are also possible. First, any of the analog processing means can be implemented with equivalent or nearly equivalent digital signal processing systems, using well known transformation methods. Second, any of the disclosed signal processing operations may be applied to a stored representation of the light reflected from the scanned target. Third, a stored representation of the signal can be derived from a one dimensional image sensor, a two dimensional image sensor, a two dimensional laser scanner (for example, a raster scanner), or any one-dimensional sensing means in conjunction with relative motion between the sensor and the target being scanned. In the case of two dimensional signals, the equalization can be applied along any single axis, a combination of any axes, or extended to a full two dimensional equalization function.

One advantage of such a constant impulse response system is that the system makes matched filtering, in which the signal processing/equalization subsystems and the opto-mechanical system have the same or similar impulse responses, more feasible. Since the opto-mechanical system response is approximately constant, a single conventional time-invariant matched filter provides nearly optimum performance regardless of target position along the beam axis within the scan volume.

Another related advantage of the described system is that it makes auto-correlation or correlation filtering, in which the collected or captured signal, representative of the light intensity reflected from the target, is compared with a library of templates to interpret the signal, more feasible. Again, by virtue of maintaining the time domain impulse response width of the opto-mechanical system approximately constant along the beam axis within the scan volume, a smaller number of templates need be maintained, ideally, only templates of the rising and falling edges which result from scanning over dark-to-light and light-to-dark transitions.

In the third embodiment of the described system, the parameter which is held approximately constant is the beam power. A beam of light reflecting from or passing through any surface will suffer losses at the surface, the magnitude of which will depend partly upon the orientation of the surface in relation to the orientation of the incident beam. This effect is, in general, more pronounced for strongly polarized light, such as that obtained from a laser. Referring back to FIG. 1, a beam of at least partially polarized light produced by the module 1 (such as a visible laser diode "VLD") is directed by the rotating scanning mirror 3 to the pattern generating mirrors (which though not shown would be intermediately situated between the scanning mirror 3 and the scanner window 4) which in turn direct the beam along a pattern of scan lines, with the orientation of the scan lines being determined by the orientation of the pattern generating mirrors.

In the scanning pattern shown in FIG. 12, for example, the beam is directed along ten scan lines—two center horizontal lines 40, two left vertical lines 41, two right vertical lines 42, two left horizontal lines 43, and two right horizontal lines 44. Since the beam produced by the VLD module 1 may be at least partly polarized, that beam will suffer polarization losses as it reflects off the scanning mirror 3 and the pattern generating mirrors and passes through the scanner window 4, with the magnitude of the loss differing amongst the scan lines depending on the orientation of the particular pattern generating mirror used to produce each line. Although the VLD module 1 may be rotated to increase the power for at least some of the scan lines, this technique will only be successful in increasing either the horizontal or vertical scan lines, but not both, since these orientations are nearly orthogonal to each other. Therefore, other techniques must be utilized. Further power variations result from the fact that the angle of incidence of the beam on the window 4 varies for each scan line.

Figure 13:
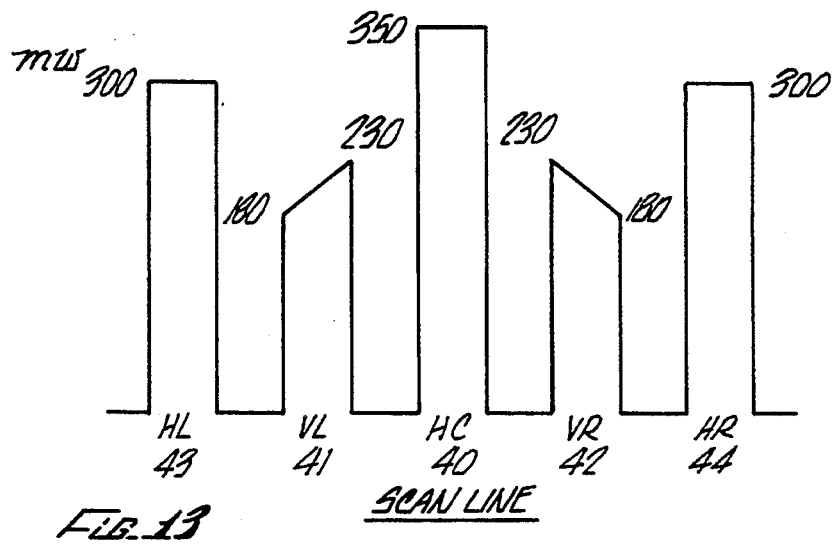
FIG. 13 is a graph illustrating the power profile of the scan lines of FIG. 12.

Consequently, the power of the beam will typically vary across the various scan lines. FIG. 13 illustrates a typical power distribution which may result for the scan lines of FIG. 12. In this example, each of the bars represents a particular scan line orientation, with the height of the bars being a measure of the power for that orientation. Each of the bars is labelled at its base with an identifying numeral, corresponding to FIG. 12, of the scan line to which it pertains, and is labelled at its top with the power (in mW) achieved by the beam along that particular scan line. As shown, in this embodiment, the beam power ranges from 180 mW—for the vertical left and vertical right scan lines—to 350 mW—for the horizontal center scan lines.

Since the beam power varies across the scan lines, the intensity of the reflected light collected by the scanner will likewise vary, requiring a greater dynamic range in the signal processing electronics than would otherwise be required, and also requiring capabilities such as adaptive thresholding to help distinguish the resultant signal from noise. However, if the beam power could be held approximately constant over the scan lines, the dynamic range of the signal processing electronics could be reduced, and the need for capabilities such as adaptive thresholding could likewise be reduced.

Typically in a multiple line, prior art scanner, for example, beam power within the scan volume might vary 50–60% (or more) over the scan volume. By employing beam power compensation as described below, this variation can be virtually eliminated under nominal conditions, leaving only variations due to process and temperature, etc. By reducing beam power variation in this way, the dynamic range of the signal processing electronics may be reduced, and the capability of the electrical system to properly compensate for unwanted variations in the amplitude modulation depth of said signal may be enhanced.

Figure 14:
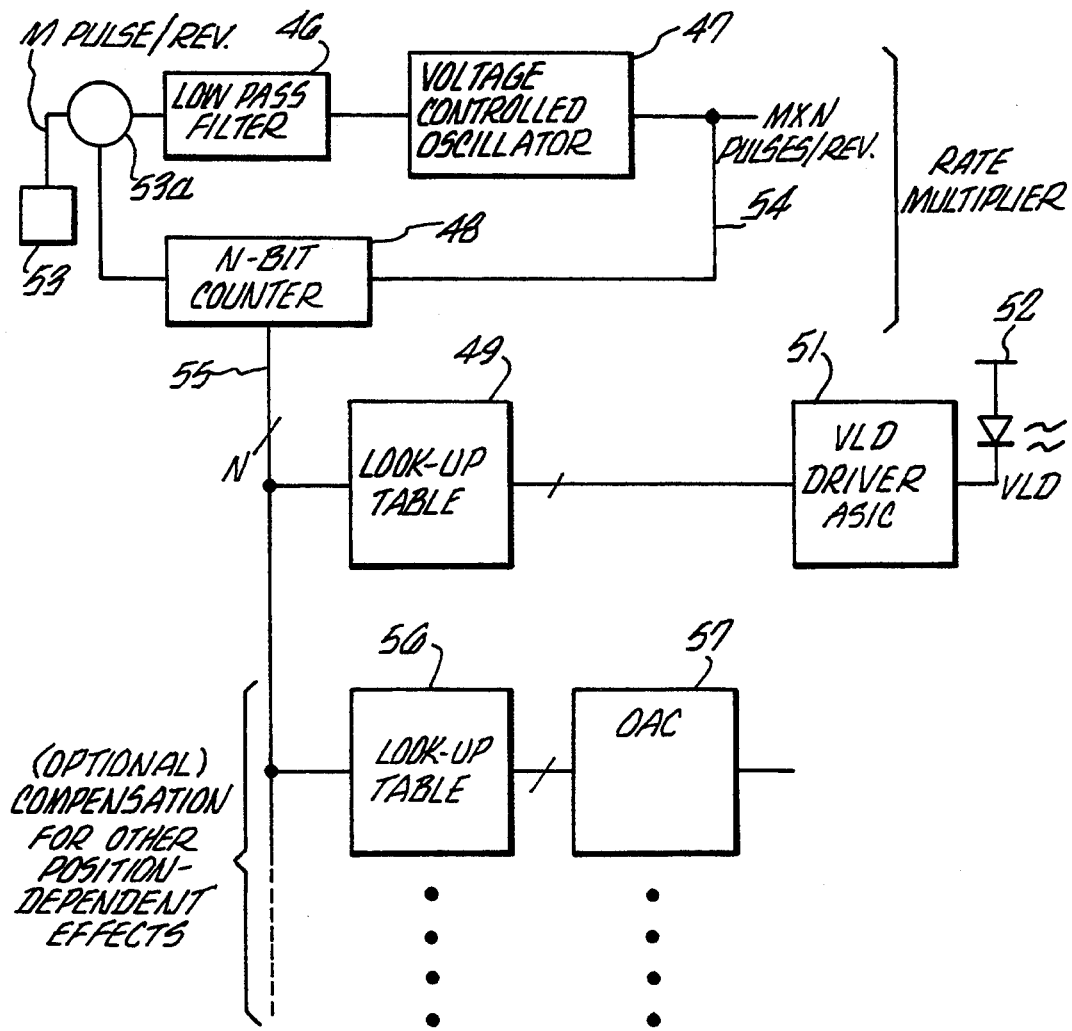
FIG. 14 is a circuit diagram illustrating circuitry for achieving at least partial compensation of beam power variation across the scan lines of FIG. 12.

An embodiment of a system which can be used to maintain the beam power in the scan volume approximately constant over all scan lines is illustrated in FIG. 14. As shown, the system comprises a phase/frequency detector 45, a low-pass filter 46, a voltage controlled oscillator 47, a counter 48, a look-up table 49, a VLD Driver 51, and a VLD 52.

The system operates as follows. A pulse generator means 53, such as a tachometer or a photodiode in the scanning path is provided to generate a predetermined number of pulses M on signal line 53a per revolution of the scanning mirror. The circuitry is configured such that a phase locked loop is formed between the phase/detector 45, the low pass filter 46, the voltage-controlled oscillator 47, and the counter 48. The phase locked loop functions as a rate multiplier insofar as it provides a signal line 54 which has a frequency which is N times the frequency of the pulses on signal line 53a.

The counter 48 functions to produce a digital number on signal line 55 which indicates, in an N-bit digital word, the position of the scanning mirror within a 360°/M arc. This digital number is input to the look-up table 49, in which is stored a table of values used to set the power of the VLD 52 via the VLD driver 51. The values in the look-up table 49 are chosen to compensate for the previously-discussed polarization and angle-of-incidence losses. The output of the VLD Driver 51 is then used to control the output power of the VLD 52.

Compensation of other angular-position dependent parameters could be accomplished by adding additional look-up tables 56 (in combination with digital-to-analog converters, DAC, 57), which are all addressed by the same counter 48. Examples of these parameters include first-derivative thresholds, preamplifier gain (to compensate for losses in the optical return path), low-pass filter bandwidth, and high frequency boost (equalization). Some of these do not require eight-bit resolution, and it should be appreciated that multiple DACs could be addressed by a single look-up table.

The VLD 52 may be turned completely off during the "dead time" during which the laser beam does not exit the housing. This shut-off is advantageous in that laser life may be increased. However, if a photodiode in the scanning path is used to provide angular position information to the rate multiplier, provision must be made to lock the laser at some constant power during start-up until the rate multiplier achieves phase lock, since otherwise, the laser might initially be off when the beam should be crossing the photodiode.

Figure 14A:
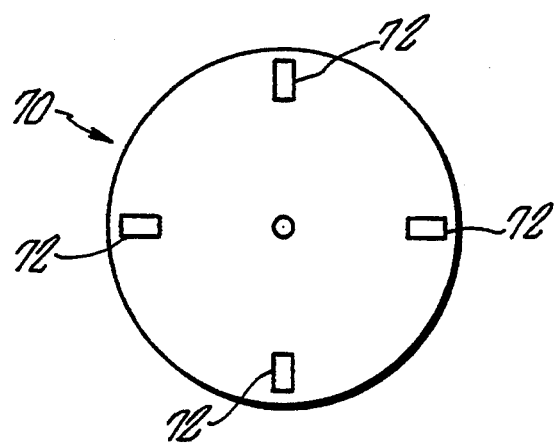
FIGS. 14a-14c illustrate exemplary optical encoding wheels for use in alternate embodiments in which compensation for beam power variation across the scan lines of FIG. 12 is achieved.

FIG. 14a shows an optical encoding wheel 70 which may be used to generate a digital signal associated with the angular position of the scanning mirror. The encoding wheel 70 has identification means 72 comprising marks or holes (the number of such marks or holes being sufficient to uniquely identify each pattern repetition associated with the scanning mirror, i.e., usually one mark or hole per mirror segment). An emitter/detector pair (not shown) is used to read the identification means 72. Rate multiplication and electrical encoding (as described above) are then used to uniquely identify angular positions between the marks or holes and to adjust the beam power accordingly based on values stored in a look-up table.

Figure 14B:
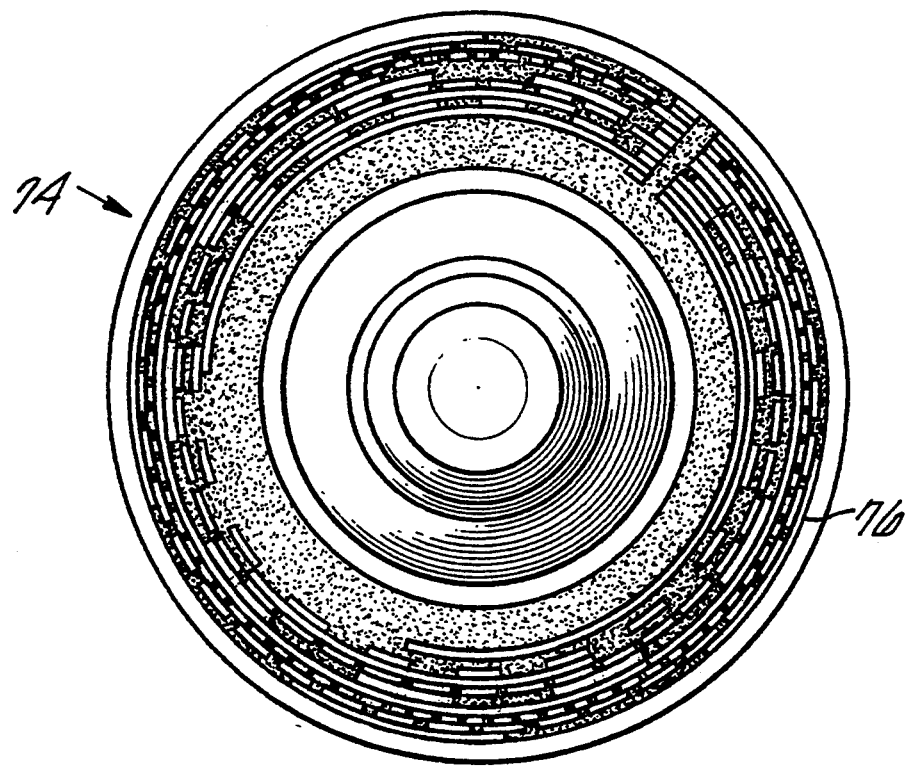

In an alternative embodiment to that shown in FIGS. 14 and 14a, an optical encoding wheel 74 (ref. FIG. 14b) is used to directly provide a digital word which is selected to produce the appropriate optical power for the associated angular position, thus eliminating the need for a look-up table. In this embodiment, the encoding wheel 74 comprises identification means 76, e.g., marks or holes, situated in concentric rings around the periphery of the wheel. An n-bit digital word (the length of which corresponds to the number of concentric rings) is formed by reading the marks or holes using n emitter/detector pairs (not shown), and thus translating the marks or holes into a digital word which sets the laser diode power directly (thus varying the beam power in accordance with the angular position of the scanning mirror).

Figure 14C:
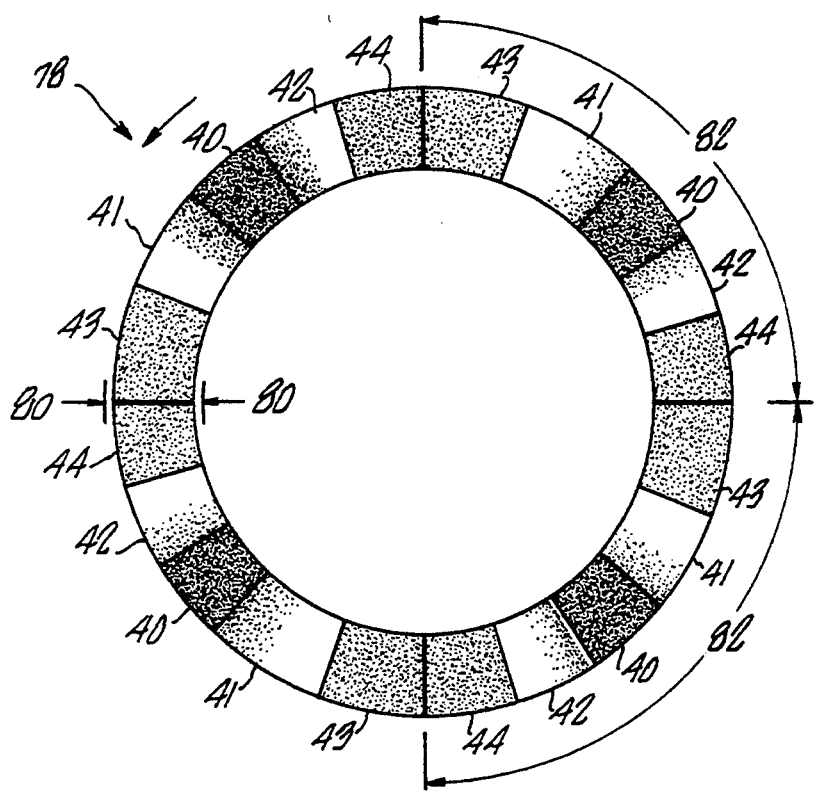

In another alternative embodiment, shown in FIG. 14c, an encoding wheel 78 is attached to or cooperative with the rotating scanning mirror such that, for example, a separate portion of the encoding wheel is associated with and may be presented in response to the position of the scanning mirror. In this embodiment, the laser beam itself passes through the wheel periphery 80, which is coated or otherwise processed such that its transmissivity varies in proportion to polarization and angle-of-incidence losses which would be realized by the beam (i.e., based on the positions of the scanning mirror and any pattern generation mirrors which are directing its path—as previously described with reference to FIG. 12).

With reference to FIG. 14c, the encoding wheel 78 illustrated may be utilized in a system wherein the scanning mirror has four mirror segments. A separate section 82 of the wheel is associated with each segment of the scanning mirror. Each separate section 82 is further subdivided into portions 40–44 which are associated with the various scan pattern lines of FIG. 12. Each sub-portion 40–44 of the wheel is processed such that its transmissivity compensates for beam power losses (as described with reference to FIG. 13). In this manner, the beam power losses are automatically compensated for, based on the position of the scanning mirror, as the beam passed through the wheel. Thus, the beam power would be stabilized over the scan pattern and the need for a look-up table would again be obviated.

Additional details regarding the use and incorporation of encoding wheels of the type described herein may be found in the publication "DC MOTORS, SPEED CONTROLS, SERVO SYSTEMS", fifth edition, chapter 7, published by Electro-Craft Corporation, which is hereby incorporated by reference herein.

It will be apparent from the foregoing that, while particular preferred embodiments have been illustrated and described, various modifications can be made without departing from the spirit and scope of the invention. Accordingly, it is not intended that the invention be limited, except as by the appended claims.

What is claimed is:

1. A scanner comprising:
    an opto-mechanical system for providing a moving beam of light having a beam axis, directing said beam along an outgoing optical path toward a target situated within a scan volume, and scanning said beam over the target in a predetermined pattern;
    a collection system for collecting light reflected from or scattered off the target, the collected light having a given intensity; and
    an electrical system operatively coupled to said collection system for forming a signal having an amplitude at least partly determined by the given intensity of the collected light;
    wherein said opto-mechanical system is configured to direct said beam into the scan volume such that at least one parameter associated with said opto-mechanical system, which would otherwise vary over the scan volume, remains approximately constant along the beam axis within the scan volume, thereby improving the capability of said electrical system to properly compensate for unwanted variations in the amplitude modulation depth of said signal.

2. The scanner of claim 1 wherein said beam of light comprises a laser beam.

3. The scanner of claim 1 wherein said opto-mechanical system has a time domain impulse response width, and is configured such that said time domain impulse response width of said opto-mechanical system is the parameter which remains approximately constant along the beam axis within the scan volume.

4. The scanner of claim 3 wherein said opto-mechanical system is configured to produce a beam waist along said optical path, and to position said beam waist such that said time domain impulse response width of the opto-mechanical system remains approximately constant along the beam axis within the scan volume.

5. The scanner of claim 4 wherein said opto-mechanical system has a scanning mirror with an optical center of rotation, and said opto-mechanical system is configured to position said beam waist at said optical center of rotation of said scanning mirror.

6. The scanner of claim 4 wherein said opto-mechanical system has a scanning mirror with a center of rotation, and said opto-mechanical system is configured to position said beam waist at a position between said optical center of rotation of said scanning mirror and the scanner window.

7. The scanner of claim 6 wherein said opto-mechanical system is configured to position said beam waist at the window of the scanner.

8. The scanner of claim 7 wherein said opto-mechanical system is configured to position said beam waist within ½ inch (1.27 cm) of the window of the scanner.

9. The scanner of claim 3 wherein said beam, in cross-section, has a spot size, and is directed to move at a linear spot velocity, and said opto-mechanical system is configured such that said spot velocity and said spot size of said beam both increase approximately linearly along the beam axis within the scan volume.

10. The scanner of claim 3 wherein said time domain impulse response width is maintained throughout the scan volume to within ±25% of its value at a window of the scanner.

11. The scanner of claim 3 wherein said time domain impulse response width is maintained throughout the scan volume to within ±10% of its value at a window of the scanner.

12. The scanner of claim 1 wherein said beam, in cross-section, has a spot size and is directed to move at a linear spot velocity, and said opto-mechanical system is configured such that said parameter which remains approximately constant along the beam axis within the scan volume is the ratio of the spot size of the beam to the linear spot velocity.

13. The scanner of claim 12 wherein the ratio of said spot size of the beam to the linear spot velocity is maintained to a value within ±25% of its value at a window of the scanner.

14. The scanner of claim 1 wherein the parameter which remains approximately constant along the beam axis within the scan volume is selected from the group consisting of time domain impulse response width, ratio of said spot size of the beam to the linear spot velocity, and beam power.

15. The scanner of claim 1 wherein the opto-mechanical system includes a rotating scan mirror and control means for controlling rotational velocity of the rotating scan mirror, said control means adjusting the velocity of the rotating scan mirror to correspond to a given linear spot velocity at any distance between the scanner and the target within the scan volume to maintain approximately constant linear spot velocity on the target.

16. The scanner of claim 15 wherein said opto-mechanical system further comprises means for holding spot size constant over the scan volume.

17. The scanner of claim 15 wherein said opto-mechanical system includes an optical element positioned in the outgoing optical path to maintain spot size of said beam approximately constant along the beam axis within the scan volume.

18. The scanner of claim 17 wherein said optical element is an axicon.

19. The scanner of claim 1 wherein said electrical system is further configured to equalize the signal for unwanted variations in amplitude modulation depth along the beam axis within the scan volume.

20. The scanner of claim 19 wherein said electrical system is further configured to equalize the signal in such a way that variation in group delay response over the spectral passband is minimized.

21. A scanner comprising:
an opto-mechanical system for providing a moving beam of light having a beam axis, directing said beam along an outgoing optical path toward a target situated within a scan volume, and scanning said beam over the target in a predetermined pattern, said opto-mechanical system being configured to have an impulse response which is approximately constant within the scan volume;
a collection system for collecting light reflected from or scattered off the target, the collected light having a given intensity; and
an electrical system operatively coupled to said collection system for producing a signal having an amplitude determined at least partly by the intensity of the collected light, said electrical system including a filter configured to limit the spectral response of said signal, said filter having approximately constant group delay over the filter spectral passband.

22. The scanner of claim 21 wherein a maximum value of the group delay is held to within 15% over its minimum value through the scan volume.

23. The scanner of claim 21 wherein the maximum value of the group delay is held to within about 6–8% over its minimum value through the scan volume.

24. The scanner of claim 21 wherein said electrical system is further configured to equalize said signal for unwanted variations in amplitude modulation depth and/or group delay response along the beam axis within the scan volume.

25. A scanner comprising:
an opto-mechanical system for providing a moving beam of light having a beam axis, directing said beam along an outgoing optical path toward a target situated within a scan volume, and scanning said beam over the target in a predetermined pattern;
a collection system for collecting light reflected from or scattered off the target, the collected light having a given intensity; and
an electrical system operatively coupled to said collection system for producing a signal having an amplitude determined at least partly by the intensity of the collected light, said electrical system including a filter configured to limit the spectral response of said signal, said electrical system being further configured to equalize said signal for unwanted variations in amplitude modulation depth and/or group delay response along the beam axis within the scan volume, said filter having approximately constant group delay over the filter spectral passband and said filter further comprising an equalizing signal processing subsystem which includes a low pass filter having an output, a high pass filter in parallel with said low pass filter and also having an output, and a summation stage having at least two inputs, wherein said output of said low pass filter is coupled to a first input of said summation stage, and said output of said high pass filter is coupled to a second input of said summation stage.

26. The scanner of claim 25 wherein said first and second inputs of said summation stage have opposite polarity.

27. The scanner of claim 21 wherein said filter is of the transitional-Gaussian family of filters.

28. The scanner of claim 21 wherein said filter is selected from the group consisting of: a transversal filter, a tapped-delay line filter, a finite impulse response digital filter, a Bessel filter, a Linear Phase with Equiripple Error filter, a delay-equalized filter, a matched filter, and a correlation filter.

29. A method for scanning a target comprising the steps of:
locating a target within a desired scan volume;
providing a beam having a beam axis;
directing said beam along an outgoing optical path toward the target;
scanning said beam over the target in a predetermined pattern;
collecting light reflected from or scattered off the target, the collected light having an intensity;
forming a signal having an amplitude determined, at least in part, by the intensity of the collected light; and
improving the capability of equalizing said signal for unwanted variations in amplitude modulation depth.

30. The method of claim 29 further comprising the steps of:
holding at least one parameter, which would otherwise vary along the beam axis within the scan volume, approximately constant over the scan volume, thereby improving the equalizing capability; and
equalizing said signal, at least in part, for unwanted variations in amplitude modulation depth.

31. The method of claim 30 further comprising:
producing a beam waist along said optical path; and
positioning said beam waist such that the time domain impulse response width is said parameter being held approximately constant along the beam axis within the scan volume.

32. The method of claim 30 wherein said parameter which is held approximately constant is the time domain impulse response width of said opto-mechanical system.

33. The method of claim 32 wherein said beam provided has, in cross-section, a spot size, and said beam is scanned over the target at a linear spot velocity, further comprising:
approximately linearly increasing said linear spot velocity and said spot size of said beam over the scan volume.

34. The method of claim 29 wherein said beam has, in cross-section, a spot size, and said beam is scanned over the target at a linear spot velocity, further comprising:
holding the ratio of said spot size of said beam to said linear spot velocity approximately constant along the beam axis within the scan volume.

35. The method of claim 29 wherein said beam has, in cross-section, a spot size, and said beam is scanned over the target at a linear spot velocity, further comprising:

holding said linear spot velocity and said spot size of said beam approximately constant along the beam axis within the scan volume.

36. The method of claim 29 wherein said beam provided is a laser beam.

37. A method for scanning a target comprising:
locating a target within a desired scan volume;
providing a beam having a beam axis;
directing said beam along an optical path to the target;
scanning said beam over the target in a predetermined pattern;
collecting light reflected from or scattered off the target, the collected light having an intensity;
producing a signal having an amplitude determined at least partly by the intensity of the collected light; and
band-limiting said signal with a filter exhibiting approximately constant group delay response within its passband.

38. The method of claim 37 further comprising:
equalizing said signal, at least in part, for unwanted variations in amplitude modulation depth along the beam axis within the scan volume.

39. A scanner comprising:
an opto-mechanical system for providing a beam having a beam axis, directing said beam along an optical path to a target situated within a desired scan volume, and scanning said beam over the target in a predetermined pattern, wherein said beam in cross-section, has a spot size, and said opto-mechanical system is configured to increase said spot size of said beam such that depth of focus is increased and the effects of noise on the target are averaged out;
a collection system for collecting light reflected from or scattered off the target, the collected light having an intensity; and
an electrical system operatively coupled to said collection system for producing a signal having an amplitude determined at least partly by the intensity of the collected light and for equalizing said signal, at least in part, for unwanted variations in the amplitude modulation depth of said signal caused by the increased spot size along the beam axis within the scan volume.

40. A method for scanning a target comprising:
locating a target within a desired scan volume;
providing a beam which has a beam axis, and, in cross-section, a spot size;
directing said beam along an optical path to the target;
scanning said beam over the target in a predetermined pattern;
increasing said spot size of said beam to average out the effects of target noise;
collecting light reflected from or scattered off the target, the collected light having an intensity;
producing a signal having an amplitude determined at least partly by the intensity of the collected light; and
equalizing said signal, at least in part, for unwanted variations in the amplitude modulation depth of said signal caused by the increased spot size.

41. A scanner comprising:
an electro-optical system for capturing an image of a target situated within a desired scan volume and providing a signal having an amplitude determined at least partly by the intensity of said image;
wherein said electro-optical system includes an optical element to introduce an aberration into said image, thereby improving the capability of said electro-optical system to compensate for unwanted variations in the amplitude modulation depth of said signal over the scan volume.

42. The scanner of claim 41 wherein said electro-optical system is configured to capture a one-dimensional image.

43. The scanner of claim 41 wherein said electro-optical system is configured to capture a two-dimensional image.

44. The scanner of claim 41 wherein said optical element is configured to introduce a spherical aberration into said image.

45. The scanner of claim 41 wherein said optical element is a soft-focus lens.

46. The scanner of claim 41 wherein said optical element is an axicon.

47. The scanner of claim 41 wherein said optical element is configured to introduce a chromatic aberration into said image, and wherein the target is illuminated with polychromatic light.

48. The scanner of claim 41 wherein said electro-optical system is further configured to compensate for unwanted variations in the amplitude modulation depth of said signal over the scan volume.

49. The scanner of claim 41 wherein said electro-optical system includes a CCD for capturing said image.

50. The scanner of claim 41 wherein said electro-optical system includes a video camera for capturing said image.

51. The scanner of claim 41 wherein said electro-optical system includes a CCD-like imaging device comprising an array of photodetectors, for capturing and representing said image in pixels, and wherein said pixels are individually addressable, providing for sensing of said image by reading out said pixels in a predetermined pattern.

52. A method for scanning a target comprising:
scanning an image of a target situated within a desired scan volume;
producing a signal having an amplitude determined at least partly by the intensity of said image; and
improving the capability for equalizing for variations in the amplitude modulation depth of said signal over the scan volume by introducing an optical aberration into said image.

53. The method of claim 52 further comprising capturing a one-dimensional image of the target.

54. The method of claim 52 further comprising capturing a two-dimensional image of the target.

55. The method of claim 52 further comprising introducing a spherical aberration into said image.

56. The method of claim 52 further comprising introducing a chromatic aberration into said image.

57. The method of claim 52 further comprising:
equalizing said signal, at least in part, for unwanted variations in the amplitude modulation depth of said signal over the scan volume.

58. A scanner comprising:
an opto-mechanical system for providing a beam, directing said beam along an optical path to a target situated within a desired scan volume, and scanning said beam over the target in a predetermined pattern;

wherein said beam has a power which otherwise varies as said beam is scanned over the target in said predetermined pattern, and said system includes a beam power control means for holding power of said beam approximately constant within the scan volume over said pattern;

a collection system for collecting light from the target, the collected light having an intensity; and an electrical system operatively coupled to said collection system for forming a signal having an amplitude determined at least partly from the intensity of the collected light.

59. The scanner of claim 58 wherein said electrical system is configured with a reduced dynamic range than otherwise would be required if said power of said beam were not held approximately constant over said pattern.

60. The scanner of claim 58 wherein said optomechanical system further comprises:

a rotating scanning mirror, with one or more reflective segments around its periphery, having an angular position with respect to an origin; and, a wheel, having a periphery which is mounted in the path of said outgoing beam, cooperative with said rotating scanning mirror, in which the transmissivity of said wheel periphery varies with the angular position of said scanning mirror in such a way as to cause said power of said outgoing beam, as measured in the scan volume, to remain approximately constant regardless of beam position.

61. The scanner of claim 58 wherein said optomechanical system further comprises:

a rotating scanning mirror, with one or more reflective segments around its periphery, having an angular position with respect to an origin which varies as said mirror rotates;

a laser for providing said beam; and means for producing a driving signal for said laser which varies according to said angular position of said scanning mirror, in such a way as to maintain said power of said beam approximately constant over said pattern.

62. The scanner of claim 61 wherein said producing means comprises:

an optical encoding wheel cooperative with said rotating scanning mirror, having on its periphery an identification means identifying one to n—where n is the number of pattern repetitions per rotation—angular positions of said rotating scanning mirror;

means for converting said identification means into electrical pulses which indicate said angular position of said scanning mirror;

means for multiplying the rate of said electrical pulses;

means for producing a digital signal having a value related to said angular position of said scanning mirror; and a look-up table coupled to and addressable by said digital signal for identifying an appropriate value for use as said driving signal.

63. The scanner of claim 62 wherein said identification means comprises at least one mark.

64. The scanner of claim 62 wherein said identification means comprises at least one hole.

65. The scanner of claim 62 wherein said digital signal is produced from a clock generated by said multiplying means.

66. The scanner of claim 61 wherein said producing means comprises:

an optical encoding wheel, cooperative with said rotating scanning mirror, having, on its periphery, identification means associated with any given angular position of said scanning mirror; and means for converting said identification means into said driving signal.

67. The scanner of claim 66 wherein said identification means comprises at least one mark.

68. The scanner of claim 66 wherein said identification means comprises at least one hole.

69. A method for scanning a target comprising:

locating a target within a scan volume;

providing a beam having a beam axis;

directing said beam along an optical path to the target;

scanning said beam over the target in a predetermined pattern, wherein said beam has a power;

holding said power of said beam within the scan volume, which would otherwise vary, approximately constant over said pattern;

collecting light reflected from or scattered off the target, the collected light having an intensity; and forming a signal having an amplitude determined at least partly from the intensity of the collected light.

70. The method of claim 69 wherein said signal is formed by an electrical system having a dynamic range, further comprising the step of:

reducing said dynamic range from a level that would otherwise be required if said power of said beam were not held approximately constant over said pattern.

* * * * *